(12) United States Patent
Nishigaki et al.

(10) Patent No.: US 6,404,919 B1
(45) Date of Patent: Jun. 11, 2002

(54) IMAGE PROCESSOR FOR ENCODING IMAGE DATA

(75) Inventors: Junji Nishigaki, Toyokawa; Shoji Imaizumi, Shinshiro; Shigeru Moriya, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/133,803

(22) Filed: Aug. 13, 1998

(30) Foreign Application Priority Data

Aug. 14, 1997 (JP) .............................. 9-219548
Aug. 14, 1997 (JP) .............................. 9-219555

(51) Int. Cl.[7] .............................................. G06K 9/34
(52) U.S. Cl. ................. 382/176; 382/162; 382/164; 382/232; 382/239
(58) Field of Search ................. 382/173, 232, 382/239, 164, 176, 162; 358/453, 464, 462

(56) References Cited

U.S. PATENT DOCUMENTS

| | | | |
|---|---|---|---|
| 4,261,018 A | * 4/1981 | Knowlton ................... 358/263 |
| 4,491,057 A | 1/1985 | Lehmbeck et al. |
| 4,786,976 A | * 11/1988 | Takao et al. ................ 358/456 |
| 4,996,603 A | * 2/1991 | Kanemitsu et al. ......... 358/462 |
| 5,307,177 A | 4/1994 | Shibata et al. |
| 5,517,327 A | * 5/1996 | Nakatani et al. ............ 358/462 |
| 5,539,842 A | * 7/1996 | Schwartz .................... 382/232 |
| 5,696,842 A | * 12/1997 | Shirasawa et al. .......... 382/176 |
| 5,742,704 A | * 4/1998 | Suzuki et al. ............... 382/176 |
| 5,867,277 A | * 2/1999 | Melen et al. ................ 358/296 |
| 5,892,852 A | * 4/1999 | Namizuka et al. .......... 382/254 |
| 5,905,579 A | * 5/1999 | Katayama et al. .......... 358/296 |
| 5,949,555 A | * 9/1999 | Sakai et al. ................. 358/462 |
| 6,307,962 B1 | * 10/2001 | Parker et al. ............... 382/170 |

* cited by examiner

Primary Examiner—Phuoc Tran
Assistant Examiner—Ali Bayat
(74) Attorney, Agent, or Firm—McDermott, Will & Emery

(57) ABSTRACT

In an image processor, a decider decides based on image data of pixels included in a block whether the block has character attribute of non-character attribute, a first encoder encodes the image data with block truncation coding, and a second encoder encodes the image data which have been encoded by the first encoder. For a block of character attribute, the binarized data binarized by the binarizer are encoded by the first and second encoders. For a block of non-character attribute, the image data are encoded by the first and second encoders without binarization. In a different image processor, it is decide whether image data of pixels in an area consisting of a plurality of blocks are all character, all ground or mixture of character and ground. Then, an encoder encodes the image data in each block differently according to the decision.

23 Claims, 27 Drawing Sheets

Block 1

| 0 | 35 | 70 | 115 |
|---|----|----|-----|
| 0 | 35 | 70 | 115 |
| 0 | 35 | 70 | 115 |
| 0 | 35 | 70 | 115 |

Block 2

| 120 | 150 | 200 | 235 |
|-----|-----|-----|-----|
| 120 | 150 | 200 | 235 |
| 120 | 150 | 200 | 235 |
| 120 | 150 | 200 | 235 |

Block 3

| 240 | 250 | 252 | 254 |
|-----|-----|-----|-----|
| 240 | 250 | 252 | 254 |
| 240 | 250 | 252 | 254 |
| 240 | 250 | 252 | 254 |

Block 1
(LA,LD)=(57,115)

| 00 | 01 | 10 | 11 |
|----|----|----|----|
| 00 | 01 | 10 | 11 |
| 00 | 01 | 10 | 11 |
| 00 | 01 | 10 | 11 |

Block 2
(LA,LD)=(177,115)

| 00 | 01 | 10 | 11 |
|----|----|----|----|
| 00 | 01 | 10 | 11 |
| 00 | 01 | 10 | 11 |
| 00 | 01 | 10 | 11 |

Block 3
(LA,LD)=(246,14)

| 00 | 11 | 11 | 11 |
|----|----|----|----|
| 00 | 11 | 11 | 11 |
| 00 | 11 | 11 | 11 |
| 00 | 11 | 11 | 11 |

| Block 1<br>Black-and-white<br>bi-level attribute<br>(Character edge)<br>$\phi ij$ | Block 2<br>Black-and-white<br>bi-level attribute<br>(Character edge)<br>$\phi ij$ | Block 3<br>Black-and-white uniform<br>density attribute<br>(Character non-edge)<br>Only LA=246 |
|---|---|---|

Block 1:
| 0 | 0 | 1 | 1 |
|---|---|---|---|
| 0 | 0 | 1 | 1 |
| 0 | 0 | 1 | 1 |
| 0 | 0 | 1 | 1 |

Block 2:
| 0 | 0 | 1 | 1 |
|---|---|---|---|
| 0 | 0 | 1 | 1 |
| 0 | 0 | 1 | 1 |
| 0 | 0 | 1 | 1 |

Block 1:
| 0 | 0 | 0 | 0 |
|---|---|---|---|
| 0 | 0 | 0 | 0 |
| 0 | 0 | 0 | 0 |
| 0 | 0 | 0 | 0 |

Block 2:
| 0 | 0 | 255 | 255 |
|---|---|---|---|
| 0 | 0 | 255 | 255 |
| 0 | 0 | 255 | 255 |
| 0 | 0 | 255 | 255 |

Block 3:
| 255 | 255 | 255 | 255 |
|---|---|---|---|
| 255 | 255 | 255 | 255 |
| 255 | 255 | 255 | 255 |
| 255 | 255 | 255 | 255 |

Block 1
(LA,LD)=(0,0)
φij

| 00 | 00 | 00 | 00 |
|----|----|----|----|
| 00 | 00 | 00 | 00 |
| 00 | 00 | 00 | 00 |
| 00 | 00 | 00 | 00 |

Block 2
(LA,LD)=(127,127)
φij

| 00 | 00 | 11 | 11 |
|----|----|----|----|
| 00 | 00 | 11 | 11 |
| 00 | 00 | 11 | 11 |
| 00 | 00 | 11 | 11 |

Block 3
(LA,LD)=(255,0)
φij

| 00 | 00 | 00 | 00 |
|----|----|----|----|
| 00 | 00 | 00 | 00 |
| 00 | 00 | 00 | 00 |
| 00 | 00 | 00 | 00 |

Block 1
All black
Mode data→"01"

Block 2
Mixture of black and white
Mode data→"10"
φij

| 0 | 0 | 1 | 1 |
|---|---|---|---|
| 0 | 0 | 1 | 1 |
| 0 | 0 | 1 | 1 |
| 0 | 0 | 1 | 1 |

Block 3
All white
Mode data→"00"

IMAGE PROCESSOR FOR ENCODING IMAGE DATA

This application is based on applications Nos. 9-219548 and 9-219555 filed in Japan, the content of which is incorporated hereinto by reference.

BACKGROUND OF THE INVENTION

1. Field of the Invention

The present invention relates to an image processor, and in particular to an image processor which encodes image data.

2. Description of Prior Art

In the field of image processing, block truncation coding is used for compressing image data, and image data divided into blocks are compressed to average information and gradation width information for a block and code information for each pixel in the block. Because the compression ratio of block truncation coding is lower than other encoding techniques, secondary encoding is further performed in order to reduce the memory capacity.

In one of secondary encoding techniques, after image data are compressed with block truncation coding, attribute is decided based on the code data, and the secondary encoding is performed according to the attribute. In another technique, after the attribute of character attribute and non-character attribute is decided on image data, the data of character attribute are subjected to bi-level encoding such as run length or Huffman encoding, and the data of non-character attribute are subjected to multi-level encoding such as JPEG. Thus, data can be encoded at a high compression ratio while keeping image quality at character edges.

However, the above-mentioned techniques that combine block truncation coding with secondary encoding are liable to deteriorate image quality obtained by encoding. When a character image is read with an input apparatus such as a scanner, an edge with a sharp gradient in the character image is read as an edge with a rather gentle gradient owing to the reading precision of the input apparatus. Therefore, though the image data can be encoded at a higher compression ratio, noises occur at edges when the encoded data are decoded, and this deteriorates image quality.

Further, an image of characters in a document is bi-level image inherently. If brightness data of such image is encoded as multi-level data by using block truncation coding and secondary encoding, efficiency is low and compression ratio is low.

An encoder may compress image data mixed with character attribute and non-character attribute with bi-level encoding for character attribute and with multi-level encoding for non-character attribute. In this encoder, conventional bi-level encoding is used for character image, while multi-level encoding is used for non-character attribute by using human visible redundancy which allows to delete unnecessary high frequency components. Then, a high compression ratio can be achieved while keeping high resolution and high frequency components of character image. However, this technique needs a multi-level encoding circuit of JPEG (orthogonal transform, quantization and Huffman encoding) and a bi-level encoding circuit such as run length encoder, and the circuit structure therefor becomes complicated. Bi-level encoding and multi-level encoding have properties different from each other, and code data of different format are stored. Then, it is very difficult to edit or process image data (e.g. rotation, enlargement and reduction) for the code data of different formats. Then, in order to edit or process image data, it is necessary for the encoded data to be decoded to the original image data of large capacity (one byte per pixel), or a large capacity of image data have to be controlled.

In an encoding technique, for a block of image data having character attribute, the image data in the block are binarized to 0 (black) or 255 (white), and block truncation coding is performed thereafter. Further, when a block has character attribute, mode information is encoded to designate all black, all white, or mixture of black and white. For data of mixture of black and white, code information in the block truncation coding data is encoded. If the encoding is performed for character attribute to store only one bit for each pixel of the binarized code data, a high coding ratio is realized by storing only two bytes of code information (00 and 11) for each pixel. However, in this technique, a character image is binarized to 0 and 255, a density difference appears at a boundary between a non-character block and a character block, and an image obtained by decoding becomes ugly.

In one encoding technique, for a block of character attribute, character information and character background information are calculated for the block, and each pixel is replaced with one of them. Then, block truncation coding is performed on the replaced data. Further, the character information, the character background information, and mode information to designate all character, all character background, or mixture of character and character background are stored. Further, for mixture of character and character background, the code data of block truncation coding are stored and encoded. However, in this technique, before block truncation coding, a large amount of image data have to be subjected to the attribute decision and the character conversion. Then, many buffer memories have to be used, and a circuit structure therefor becomes complicated.

SUMMARY OF THE INVENTION

An object of the present invention is to provide an image processor which has improved coding efficiency for character block in an image mixed with character areas and non-character (photograph or the like) areas and which does not generate noises at character edges or the like when the code data are decoded.

Another object of the present invention is to provide an image processor which has improved efficiency for character areas in an image mixed with character areas and non-character areas while maintains resolution of character areas with block truncation coding and which does not generate noises at boundaries between areas of character attribute and those of non-character attribute when the code data are decoded.

A further object of the present invention is to provide an image processor which has an encoding circuit with a simple structure.

A still further object of the present invention is to provide an image processor which can edit or process an image by using encoded data.

In one aspect of the present invention, an image processor comprises a decider which decides based on image data of pixels included in a block whether the block has character attribute of non-character attribute, a first encoder which encodes the image data with block truncation coding, and a second encoder which encodes the image data which have been encoded by the first encoder. When the decider decides that the block has character attribute, a binarizer binarizes the image data. Then, the binarized data are encoded by the first and second encoders. On the other hand, when the decider decides that the block has non-character attribute, the image data are encoded by the first and second encoders without binarization by the binarizer.

In a second aspect of the invention, an image processor comprises a decider which decides whether image data of pixels in an area are all character, all ground or mixture of character and ground. The area consists of a plurality of blocks. An encoder encodes the image data in each block differently according to the decision. For example, the attribute of image data for a block is further decided to be character or non-character, and for a block of character attribute, the image data are converted to character or ground level before block truncation coding. In a different way, the decider performs the decision on block truncation coding data. Thus, the compression ratio of image data is improved further.

An advantage of the present invention is that a sharp edge of a character image can be reproduced well even if it is read as an image having a gentle gradient.

Another advantage of the present invention is that a high compression ratio can be attained by using a relatively simple circuit structure.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
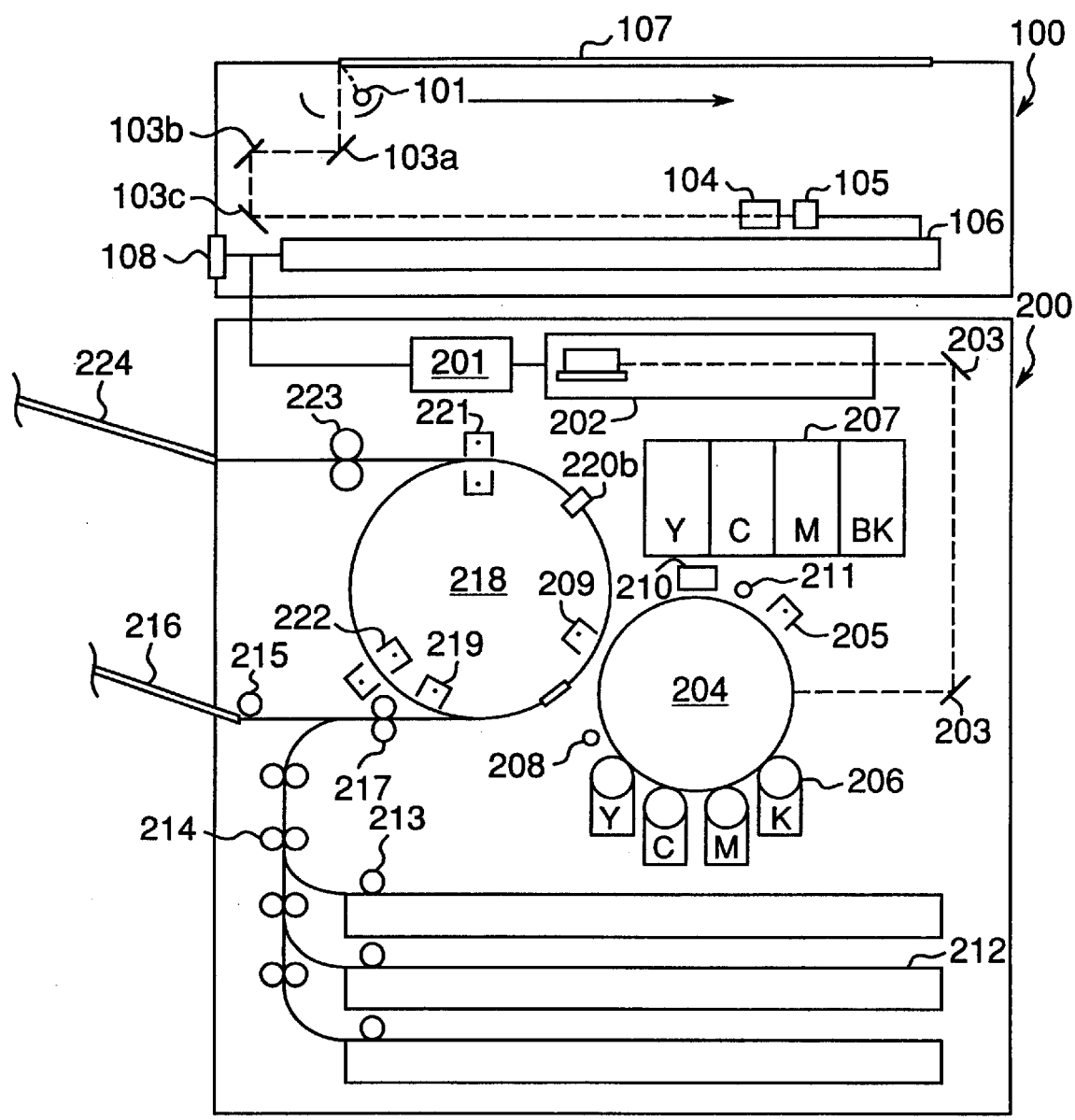
FIG. 1 is a sectional view of a digital color copying machine of a first embodiment of the invention.

Referring now to the drawings, wherein like reference characters designate like or corresponding parts throughout views. FIG. 1 shows a digital color copying machine in which a first embodiment of the invention is employed. The digital color copying machine consists of an image reader 100 and a printer 200. Usually, in a copy operation, image data read by the image reader 100 are transmitted to the printer. 200, and the printer 200 forms an image with electrophotographic process. Further, the copying machine can be connected through an interface 108 to an external apparatus. Then, image data read by the image reader 100 can be outputted to the external apparatus, or image data received from the external apparatus can be transmitted to the printer 200 to form an image.

Next, the image reader 100 is explained. When a document is read, the document is put on a platen glass 107 and illuminated with a lamp 101. A-light reflected from the document is guided by three mirrors 103 through a lens 104 to be focused on a linear CCD sensor 105. The lamp 101 and the mirror 103a are moved along a subscan direction in correspondence to magnifying power in order to scan the document over a whole face thereof. The mirrors 103b and 103c are moved simultaneously at a speed v/2 along the same direction.

The light detected by the CCD sensor 105 is converted to multi-level electric signals of red, green and blue for each pixel, and the signals are converted by a read signal processor 106 to 8-bit gradation data of cyan (C), magenta (M), yellow (Y) or black (BK), and they are sent to an external output port 108 and to the printer 200.

Next, the printer 200 is explained. The printer 200 has many elements arranged around an exposure head 202, a photoconductor 204 and a transfer belt 218. First, an image data correction section 201 performs corrections such as gamma correction and color correction for the image data received from the image reader 100 or the interface 108 and sends the data to the exposure head 202. In the exposure head 202, a laser beam is emitted according to electrical signals of the image data, and the laser beam scans with a polygon mirror linearly, and the beam propagates through mirrors 203 onto the photoconductor 204.

Next, the structure around the photoconductor 204 is explained. Elements for electrophotographic process are arranged around the photoconductor 204. By rotating the photoconductor clockwise in FIG. 1, the electrophotographic process is performed successively. In the electrophotographic process, one routine consists of charging, exposure, transfer and cleaning, and it is repeated to form an image. Especially, for a color image, this is repeated four times for four development colors to form a full color image. First, the photoconductor 204 is charged uniformly by a sensitizing charger 205, and the sensitized photoconductor 204 is exposed with the laser beam.

As the image density is higher, the intensity of the laser beam increases to remove charges on the photoconductor by a larger amount. Then, the discharged portions (latent image) are developed with one of development units 206 in correspondence to a development color. The toner image formed on the photoconductor 204 is illuminated by a pretransfer charger 208 to remove excess charges. Then, it is transferred by a transfer charger 209 onto a paper on the transfer belt 218. Then, a cleaner 210 cleans excess toners, and a main eraser 211 discharges the remaining charges on the photoconductor 204 for preparing the photoconductor 204 for a next process.

Next, a paper is supplied and carried as explained below. A paper is supplied to the transfer belt 218 as for forming an output image thereon. Papers of various sizes are set in paper cassettes 212, and a paper of desired size is carried from one of the cassettes 212 by a roller 213 to a carriage path and carried by rollers 214 onto timing rollers 217. When a paper of a desired size is not set in the cassettes 212, a paper sheet can also be supplied from a paper tray 216, and it is supplied by a roller 215 to the timing rollers 217.

Next, transfer and fixing of toner image are explained. The transfer belt 218 is a cylinder that has a transfer film on its surface, and it is rotated anti-clockwise at the same speed as the photoconductor 204. The timing rollers 217 supply a paper sheet towards the transfer belt 218 at a predetermined timing, and the paper sheet is absorbed electrostatically by an absorption charger 219. While keeping toner images on the paper by the transfer charger 209, toner images of the four development colors are lapped on the paper. After all the toner images are transferred onto the paper, a pair of chargers 221 discharge the charges on the paper and separates the paper from the transfer belt 218 respectively. Then, the chargers 221 again discharge the transfer belt 218 for a next paper absorption. The toner images on the paper are heated for fixing by fixing rollers 223, and the paper is carried out onto a tray 224.

Figure 2:
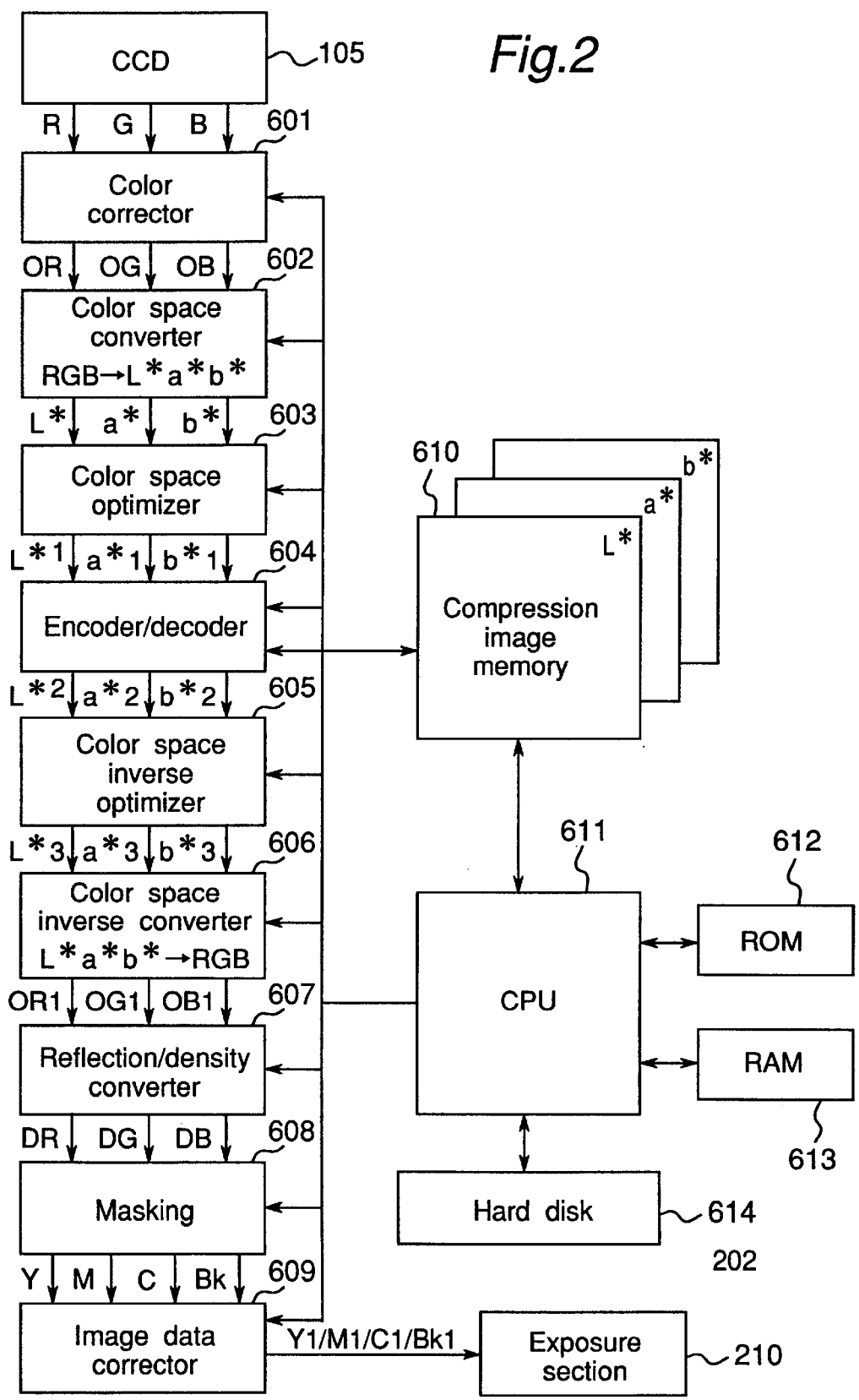
FIG. 2 is a block diagram of an image processor.

FIG. 2 shows schematically a process for image data received from the CCD sensor 105 and output to the exposure head 202 of the printer 200. The light incident on the CCD sensor 105 is subjected to photoelectric conversion to output electric signals R, G and B of red, green and blue. The analog-to-digital conversion and the shading correction are not explained here.

Next, a color correction processor 601 converts the image data to standard image data OR, OG and OB specified in NTSC and high density television standards for the ease of data manipulation.

$OR=F1R(R, G, B)$,
$OG=F1G(R, G, B)$, and
$OB=F1B(R, G, B)$.

Each conversion function F1R, F1G or F1B is a sum of signals R, G and B multiplied with predetermined coefficients. For example, for F1R, the coefficient for argument R is higher than the others for G and B.

Next, a color space converter 602 converts the standard data OR/OG/OB to data of $L^*a^*b^*$ calorimetric system. Reasons for converting the standard image data OR, OG to data of $L^*a^*b^*$ calorimetric system are that the image data can be coded with relatively low image deterioration and that transmission of color image data is easy between various apparatuses.

$L^*=F2L(OR, OG, OB)$,
$a^*=F2a(OR, OG, OB)$, and
$b^*=F2b(OR, OG, OB)$.

The conversion functions F2L, F2$a$ and F2$b$ convert the input data OR, OG and OB to XYZ colorimetric system according to conversion formulae determined in NTSC or high density television standards and further to $L^*a^*b^*$ calorimetric system. It is to be noted that any colorimetric system such as $L^*u^*v^*$, $YC_rC_b$ or HVC may be used as far as it converts image data of red, green and blue to hue, value and chroma.

Next, a color space optimizer 603 optimizes the color space in order to minimize deterioration of image quality due to encoding and decoding for $L^*a^*b^*$ data.

$L^*1=F3L(L^*)$,
$a^*1=F3L(L^*, a^*)$, and
$b^*1=F3L(L^*, b^*)$.

The conversion functions F3L, F3$a$ or F3$b$ convert the input data $L^*$, $a^*$ and $b^*$ linearly, and the data $L^*1$, $a^*1$ and $b^*1$ after the conversion contain no color information.

Next, an encoder/decoder 604 encodes $L^*1$, $a^*1$, $b^*1$ data with generalized block truncation coding to be stored in a compression image memory 610 or decodes code data in the memory 610 to be sent to following image processing. Because generalized block truncation coding is irreversible coding, the input data $L^*1$, $a^*1$, $b^*1$ are somewhat different from output data $L^*2$, $a^*2$, $b^*2$.

$L^*2=F4L(L^*1)$,
$a^*2=F4L(a^*1)$, and
$b^*2=F4L(b^*1)$.

The conversion functions F4L, F4$a$ and F4$b$ represent unintended conversion or data deterioration which happens on encoding or decoding. The data deterioration depends on the distribution of peripheral data, and it is found only after encoding or decoding.

Next, a color space inverse optimizer 605 performs an operation reverse to that performed at the color space optimizer 603.

$L^*3=F5L(L^*)$,
$a^*3=F5L(L^*2, a^*2)$, and
$b^*3=F5L(L^*2, b^*2)$.

The conversion functions F5L, F5$a$ and F5$b$ are the reverse functions of the conversion functions F3L, F3$a$ and F3$b$. The output data $L^*3$, $a^*3$, $b^*3$ after the conversion correspond to the data $L^*a^*b^*$ before colorimetric space optimization, and they represent color information again.

Next, a color space inverse converter 606 converts the data $L^*3$, $a^*3$ and $b^*3$ to standard image data OR1, OG1 and OB1 of red, green and blue which correspond to the data OR, OG and OB. However, the data OR1, OG1 and OB1 agree to the original data incompletely due to the above-mentioned deterioration of image data. Then, the converted data are denoted as OR1, OG1 and OB1.

OR1=F6L(L*3, a*3, b*3),

OG1=F6a(L*3, a*3, b*3), and

OB1=F6b(L*3, a*3, b*3).

The conversion functions F6L, F6a or F6b are the reverse functions of the conversion functions F2L, F2a or F2b.

Next, a reflection/density converter 607 converts the reflection data OR1, OG1 and OB1 to density data DR, DG and DB of red, green and blue.

DR=F7R(OR1),

DG=F7G(OG1), and

DB=F7B(OB1).

The conversion functions F6L, F6a or F6b are log functions.

Further, a masking section 608 converts the density data DR, DG and DB to image data of cyan C, magenta M, yellow Y and black Bk in correspondence to toner colors for printing.

Y=F8Y(DR, DG, DB),

M=F8M(DR, DG, DB),

C=F8C(DR, DG, DB), and

Bk=F8Bk(DR, DG, DB).

Each of the conversion functions F8Y, F8M, F8Y or F8Bk is a sum of signals DR, DG and DB multiplied with predetermined coefficients. For example, for F8Y, the coefficient for argument DB is higher than the others for DR and DG.

Finally, an image data corrector 609 performs gamma correction on the image data Y, M, C or Bk for linear reproduction of print density, and the data Y1, M1, C1 and Bk1 are output to the printer exposure system 202.

Y1=F9Y(Y),

M1=F9M(M),

C1=F9C(C), and

Bk1=F9Bk(Bk).

The conversion functions F9Y, F9M, F9C or F9Bk are used as correction tables determined experimentally. The exposure head 202 performs printing according to the corrected data Y1, M1, C2 and Bk1.

A central processing unit 611 sets or changes parameters for the parts used for the above-mentioned image data processing. Data in the compression image memory 610 can be written or read by the CPU 611. A read only memory (ROM) 612 stores a program executed by the CPU 611, and a random access memory 613 is used for storing parameters and the like used in the program. Data obtained by re-compression by the CPU 611 are stored in a hard disk drive 614 as a data storage device.

Figure 3:
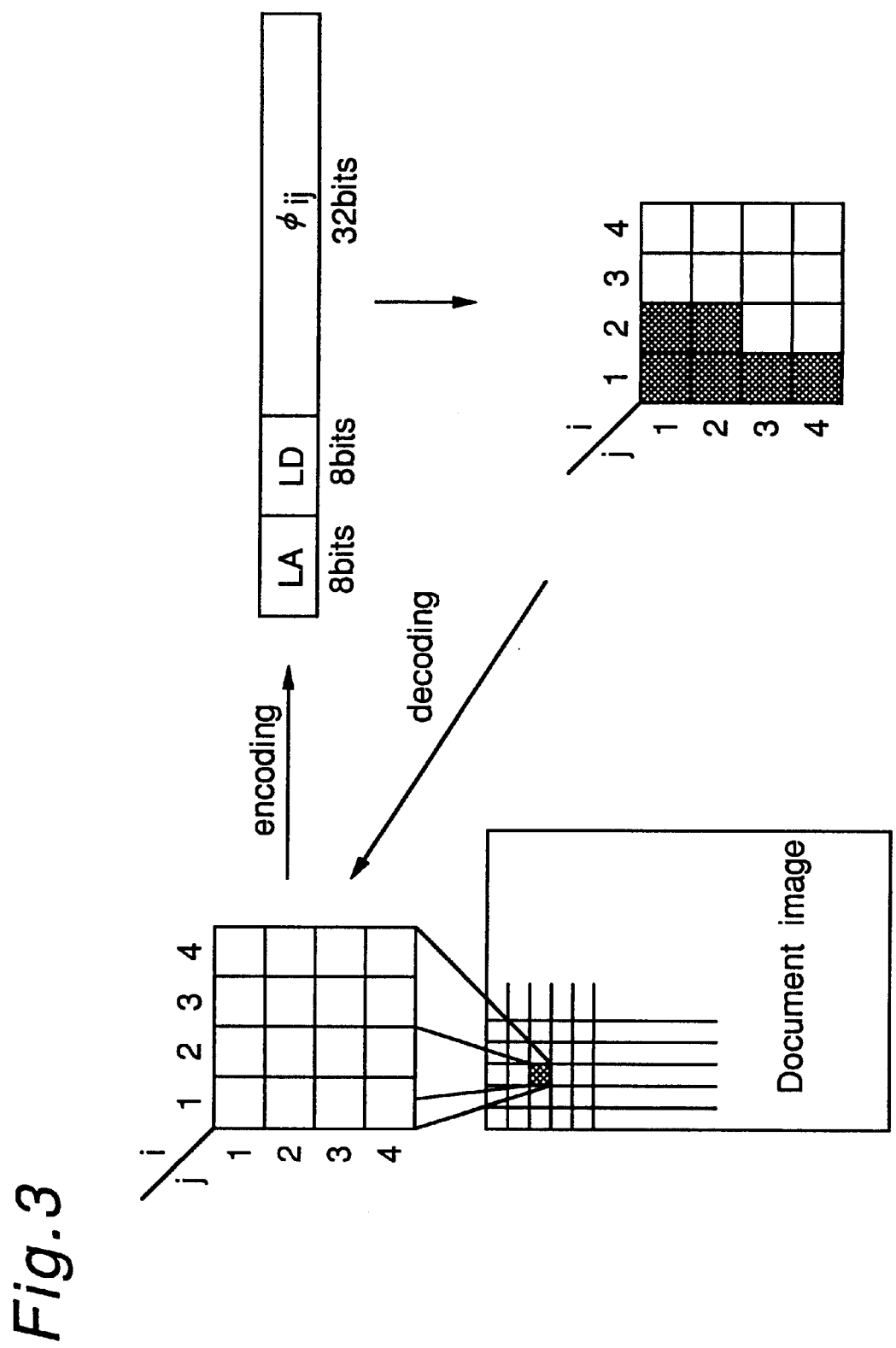
FIG. 3 is a diagram for explaining blocking on image data of a document.

The encoder/decoder 604 combines generalized block truncation coding (GBTC) with secondary encoding in the encoding and decoding of image data. Before explaining the encoding and decoding of image data, the concept of block truncation coding is explained with reference to FIG. 3. The block truncation coding used in this embodiment is a known technique. First, a document image is divided into blocks of M*N pixels (M=N=4 in this example). Then, feature quantities are extracted for image data for each block as will be explained later, and the image data are encoded by using the feature quantities. Then, the 8-bit image data of 16 pixels (16 bytes) are compressed to 6-byte code data consisting of a 1-byte average information LA, a 1-byte gradation width information LD, and 2-bit code data $\phi_{ij}$ for 16 pixels. Thus, the image data are compressed to 6 bytes, or 3/8 of the original image data. By performing the above-operation on all the blocks, all the document image data are compressed.

In the block truncation coding, a compressed image of compression ratio of 3/8 can always be obtained irrespective of image type. Therefore, the memory capacity is determined surely. Because image after the compression contains area information, edition or modification of the image is easy after the compression. Further, the compressed image data are decoded by an operation reverse to the encoding, so that an image similar to the original image can be reproduced with relatively low deterioration.

Figure 4:
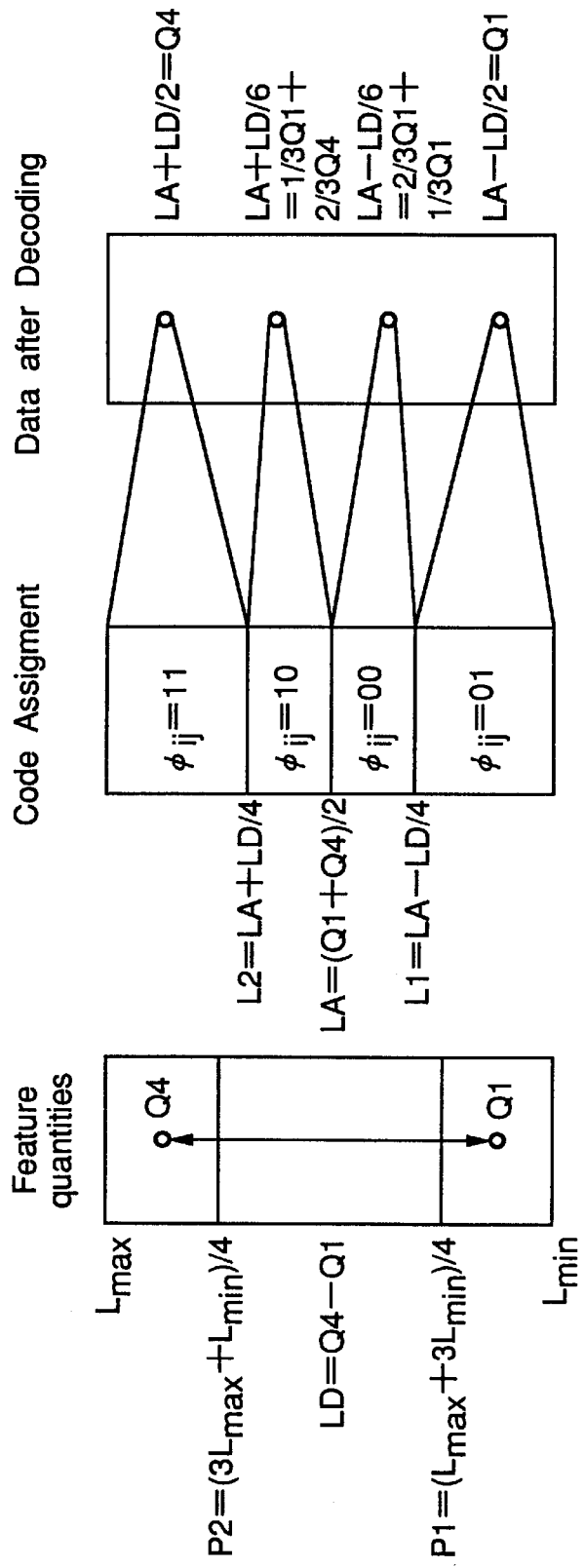
FIG. 4 is a diagram for explaining the concept of encoding and decoding algorithm of block truncation coding.

FIG. 4 shows an encoding and decoding algorithm of block truncation coding. Encoding and decoding are performed as explained next.

(A) A maximum $L_{max}$ and a minimum $L_{min}$ are determined for image data $X_{ij}$ at i-th column and j-th row in a block where i, j=1, 2, 3 or 4.

(B) Parameters P1 and P2 are determined based on $L_{max}$ and $L_{min}$, $$P1=(L_{max}+3*L_{min})/4, \quad (1)$$

and $$P2=(3*L_{max}+L_{min})/4. \quad (2)$$

(C) Next, a first average Q1 is obtained on the image data of a group of the pixels having a pixel data lower than P1.

Similarly, a second average Q4 is obtained on the image data of a group of the pixels having a pixel data larger than P2.

(D) Then, an average information LA and gradation width information LD are determined as follows:

$$LA=(Q1+Q4)/2, \quad (3)$$

and $$LD=Q4-Q1. \quad (4)$$

(E) Next, levels L1 and L2 for quantization are determined as follows:

$$L1=LA-LD/4, \quad (5)$$

and $$L2=LA+LD/4. \quad (6)$$

(F) Then, the image data in the block are divided into four groups by using the three levels, L2, LA and L1. Then, 2-bit code $\phi_{ij}$ is assigned for a pixel data $X_{ij}$ for i-th column and j-th row.

If $X_{ij} \leq L1$, $\phi_{ij} = 01$.

If $L1 < X_{ij} \leq LA$, $\phi_{ij} = 00$.

If $LA < X_{ij} \leq L2$, $\phi_{ij} = 01$.

If $L2 < X_{ij}$, $\phi_{ij} = 11$.

(G) The data obtained by generalized block truncation coding comprises 2-bit code information $\phi_{ij}$ of 16 pixels (4 bytes), a 1-byte gradation width information LD and a 1-byte average information LA (FIG. 1B), and they are stored in the memory.

(H) When the code information $\phi_{ij}$ are decoded, four types of image data are calculated by using the gradation width information LD and the average information If $\phi_{ij} = 01$, $Y_{ij} = LA - LD/2$.

If $\phi_{ij} = 00$, $Y_{ij} = LA - LD/6$.

If $\phi_{ij} = 10$, $Y_{ij} = LA + LD/6$.

If $\phi_{ij} = 11$, $Y_{ij} = LA + LD/2$.

Thus, the code information $\phi_{ij}$ are assigned to the image data $Y_{ij}$ after decoding.

As explained above, an image is encoded and decoded according to block truncation coding. Because the image after decoding has four levels in the 256 levels in each block, the decoded data will include errors with respect to the original image data. However, the errors are not obvious owing to human visual characteristics, and image deterioration is not observed for a half-tone image practically. On the other hand, for a character image, the parameters Q1 and Q4 are reserved completely. Therefore, a character image can be recovered completely if black portions of characters are smaller than P1 and white portions thereof are larger than P2.

Figure 5:
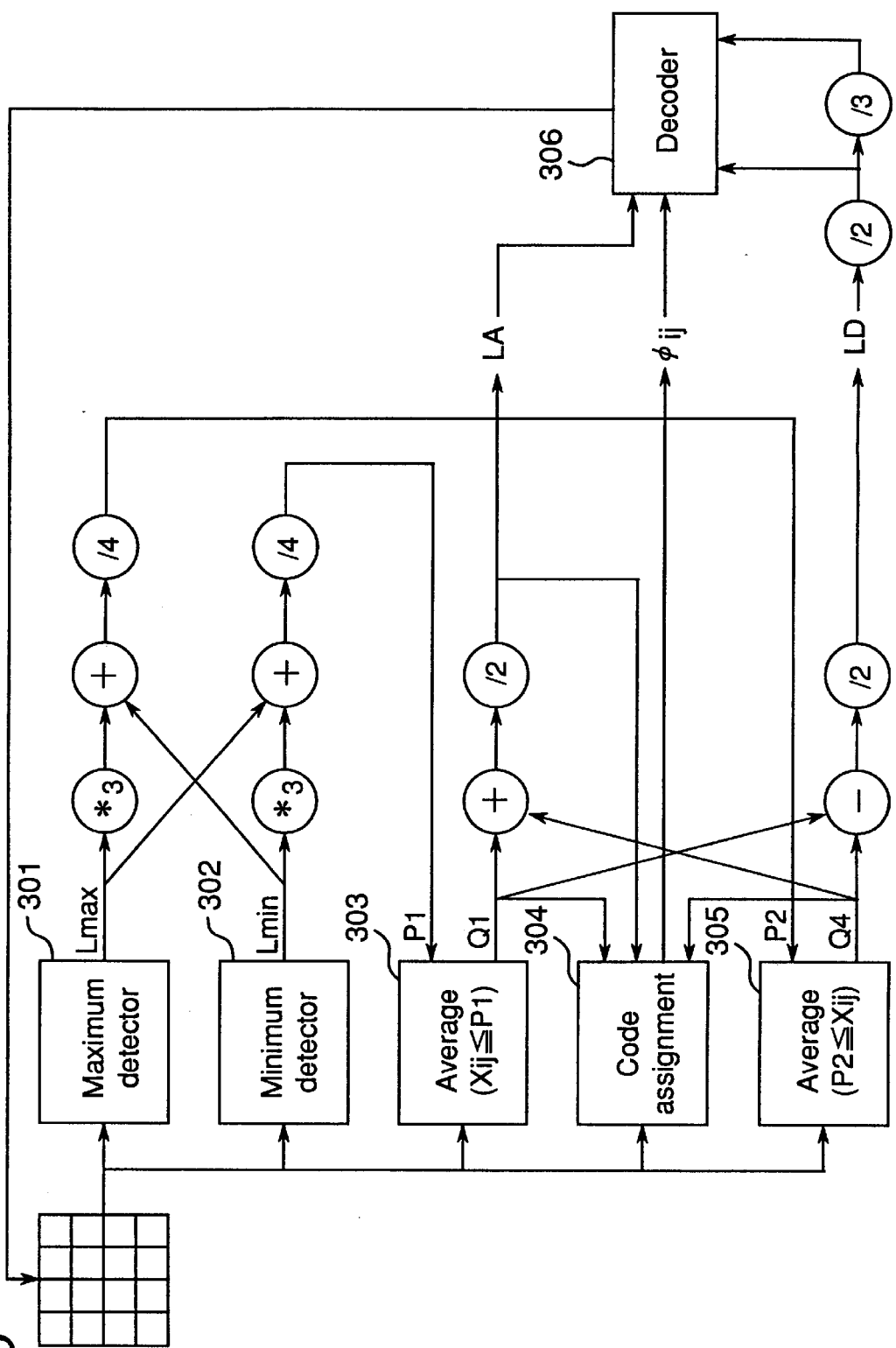
FIG. 5 is a block diagram of a block truncation coding circuit in an encoder/decoder.

FIG. 5 shows a block diagram of a block truncation coding circuit in the encoder/decoder 604. A maximum circuit 301, a minimum circuit 302, average circuits 303 and 305 determine the maximum $L_{max}$ the minimum $L_{min}$, the averages Q1 and Q4, and the like. By using these values, an assigning circuit 304 assigns 2-bit code $\phi_{ij}$ for sixteen image data in a block. A decoder 306 restores image data by using the average information LA, the gradation width information LD and the codes $\phi_{ij}$. Next, encoding and decoding as a combination of block truncation coding and secondary encoding are explained in detail. A color image may include character areas (black-and-white bi-level areas, black uniform density areas, and white uniform density areas) and non-character areas (black-and-white multi-level areas such as photograph). Multi-level color image data received from the image reader 100 are divided into M*N pixels (M=N=4 in this example). Then, before encoding, attribute of a block is determined to be character attribute or non-character attribute by using the brightness and the chromaticity in the block. If the attribute is character, the brightness data for each pixel is binarized, while if the attribute is non-character, no binarization is performed. Next, the secondary encoding is performed appropriately for each attribute by using the attribute data. For character attribute, the bi-level image data binarized as explained above are subjected to block truncation coding, while for non-character attribute, the as-received multi-level image data (brightness data and chromaticity data) are subjected to block truncation coding. Thus, the amount of information is reduced to the ratio of ⅜. Further, the secondary encoding is performed as explained below for each attribute. For character attribute, three 2-bit mode data to represent all black, all white or mixture of black and white is assigned for each 4*4 pixel block. For the mode of mixture of black and white, two bytes of code data of one bit for each pixel are stored further. Thus, the amount of information of 16 bytes is reduced to 1/4–9/4 bytes.

Figure 6:
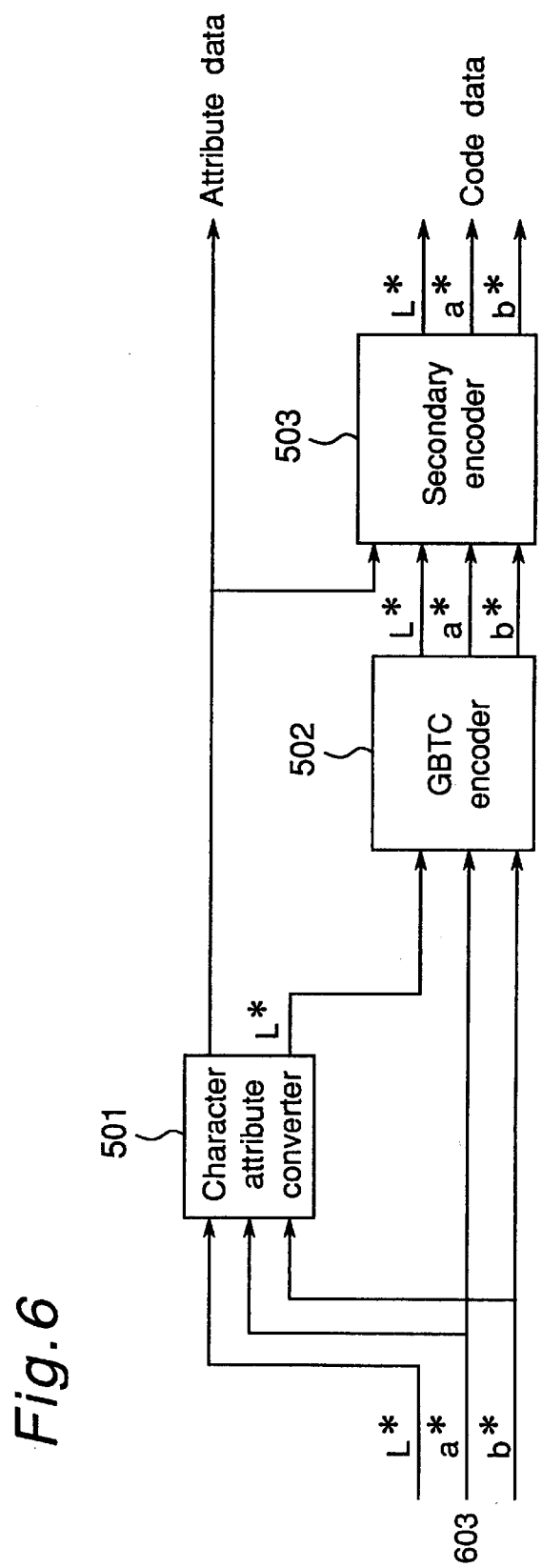
FIG. 6 is a block diagram of an encoding section of the encoder/decoder.

The encoder/decoder 604 is explained with reference to FIGS. 6 and 7. FIG. 6 shows an encoding section thereof. First, a character attribute converter 501 receives code data of brightness data L*, chromaticity data a* and b* to be received from the color space optimizer 603 (FIG. 2). It decides whether the attribute for an area of 8*8 pixels is character or non-character, and outputs the attribute data. As to the brightness data, data of 8*8 pixels of character attribute are replaced with binarized data according to character attribute conversion which will be explained later with reference to FIG. 9. Next, a GBTC encoder 502 receives the chromaticity data a* and b* from the color space optimizer 603 and the brightness data L* from the character attribute converter 501, so that for each data, 16-byte data of each block of 4*4 pixels are encoded to 6-byte code data (average information LA, gradation width information LD and code information $\phi_{ij}$). Then, a secondary encoder 503 performs secondary encoding based on the attribute data received from the character attribute converter 501 and the code data received from the GBTC encoder 502. That is, in the secondary encoding, only necessary information in the data for the 2*2 blocks or 8*8 pixels received from the GBTC encoder 502 is output according to the attribute data for the 2*2 blocks, and the unnecessary information is deleted. The result decided by the character attribute converter 501 is stored in the memory as attribute data.

Figure 7:
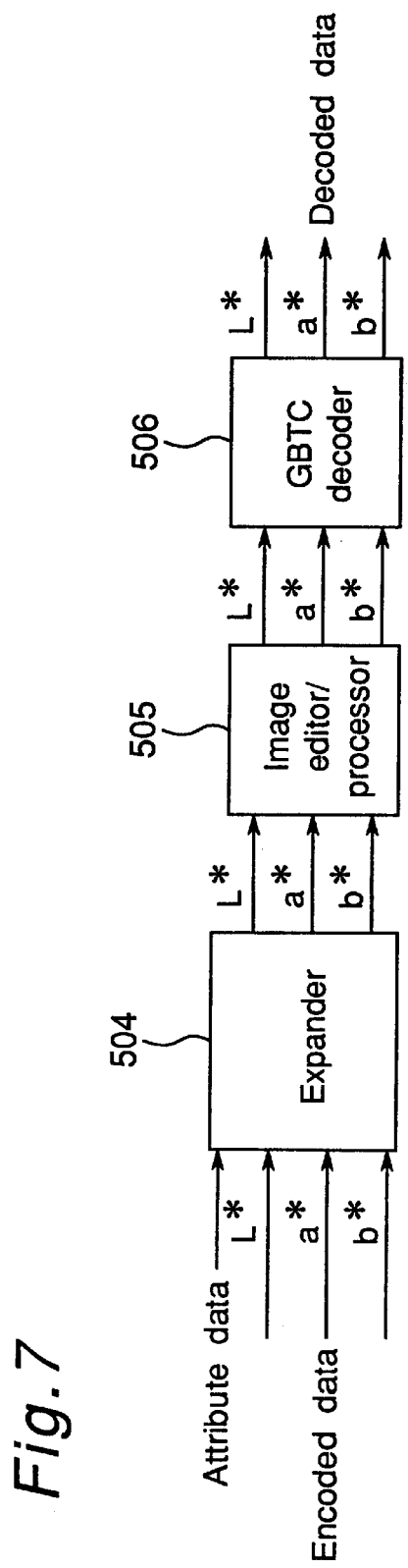
FIG. 7 is a block diagram of a decoding section of the encoder/decoder.

FIG. 7 shows a decoding section of the encoder/decoder 604 for decoding the data encoded by the encoding section shown in FIG. 6. First, an expander 504 receives the attribute data stored in the memory, and code data of brightness data L*, chromaticity data a and b are selected according to the attribute data. Then the code of each data are expanded according to the attribute data to generate 6-byte code data (average information LA, gradation width information LD and code information $\phi_{ij}$). If necessary, an image editor/processor 505 edits or processes the image data of the 6-byte output data for each block in the state of code data. Then, a GBTC decoder 506 recovers the original image.

Next, a comparison example is explained with reference to FIGS. 8–11 on problems or noises which occur at character edges when the character attribute conversion of this embodiment is not performed before the block truncation coding and the secondary encoding in contrast to the encoder shown in FIG. 6. In an ideal case, a character image consists of white ground of reflectivity 255 (or density 0) and black character of reflectivity 0 (or density 255). However, even such an ideal character image has inclined edges when it is read with reading precision of an image reader such as a scanner. For example, as shown in the graph in FIG. 8, an edge is read in a portion represented with a square in a Chinese character, and the portion is divided into first to third blocks of blocks of 4*4 pixels. Thus, image data (brightness L*) extends over the three blocks. The edge exists actually at the second block, and the image data has to change from the minimum to the maximum at a center of the second block. However, the read image data has a gradient as shown in the graph in FIG. 8 represented with a bold line in a direction perpendicular to the edge.

Figures 8, 9, 10:
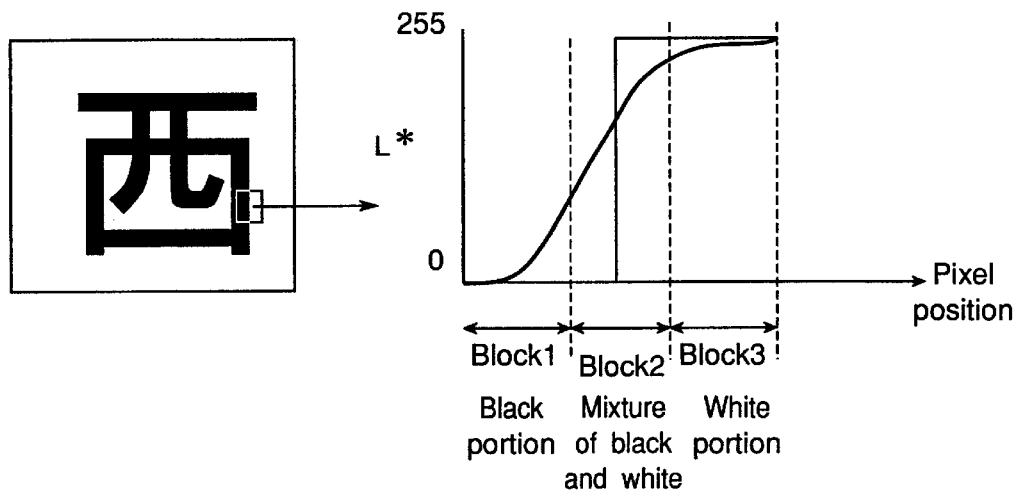
FIG. 8 is a diagram for explaining an example of an image of a Chinese character.
FIG. 9 is a diagram of an example of image data of three blocks.
FIG. 10 is a diagram of prior art code data of the image data of three blocks shown in FIG. 8.
Figures 11, 12, 13:
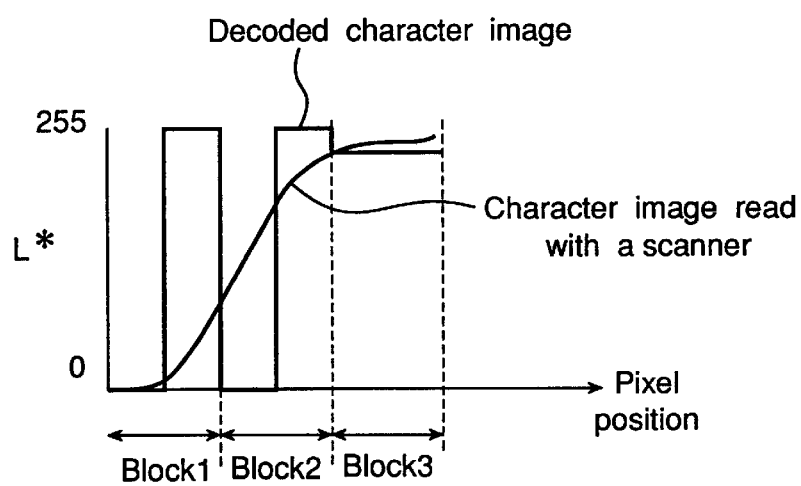
FIG. 11 is a diagram of prior art data obtained by secondary encoding on the image data of three blocks shown in FIG. 8.
FIG. 12 is a diagram of an example of a character image decoded from prior art GBTC data.
FIG. 13 is a diagram of an example of image data obtained by attribute processing on the image data of three blocks shown in FIG. 8.

FIG. 9 shows an example of 1-byte data for each pixel in the first to third blocks, wherein the reflectivity data are represented in decimal numbers. FIG. 10 shows average information LA and gradation width information LD, and code data $\phi_{ij}$ for each pixel obtained by block truncation coding for the three blocks shown in FIG. 9. FIG. 11 shows a result of attribute decision and code data obtained by secondary encoding for the average information LA, gradation width information LD, and code data $\phi_{ij}$ shown in FIG. 10. That is, the first and second blocks are decided to have black-and-white bi-level attribute because gradation difference is relatively large (gradation width information LD is "115" in decimal notation for the two blocks), and the upper one bit of 2-bit $\phi_{ij}$ is used as code information. That is, as shown in FIG. 11, for the first block, pixel data of 0 and 35 (decimal notation) shown in FIG. 9 become 1-bit code information of "0" after secondary encoding, and pixel data of 70 and 115 (decimal notation) shown in FIG. 9 become 1-bit code information of "1" after secondary encoding. Similarly, for the second block, pixel data of 120, 150, 200 and 235 (decimal notation) shown in FIG. 9 become 1-bit code information of "0", "0", "1" and "1" after secondary encoding. The third block is decided to have black-and-white uniform density attribute because gradation difference is small (gradation width information LD is "14" in decimal notation), and only average information LA of "246" in decimal notation is encoded further. FIG. 12 shows a character image recovered from the code data shown in FIG. 11 obtained by secondary encoding. Because an edge of the character image read with the scanner has a gradient, problems such as noises and white dropping-out occur at edges, and the obtained image looks poorly.

Figures 14, 15, 16:
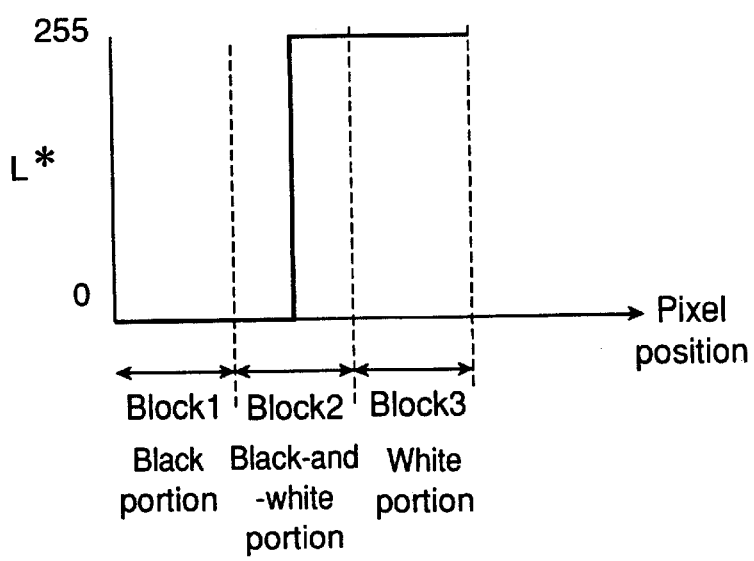
FIG. 14 is a diagram of an example of code data obtained on the image data of three blocks shown in FIG. 8.
FIG. 15 is a diagram of an example of code data obtained on the image data of three blocks shown in FIG. 8.
FIG. 16 is a diagram of an example of a character image decoded from the code data.

Next, an example of encoding according to the embodiment of the invention is explained with reference to FIGS. 13–16 on the example of the image data shown in FIG. 9 which are read with the scanner. In this example, block truncation coding is performed after character attribute conversion, and secondary encoding is performed on the code data according to the attribute. The character image data having a gradient shown in FIG. 9 are assigned to white (reflectivity of "255" in decimal notation) and black (reflectivity of "0" in decimal notation). That is, as shown in FIG. 13, if the threshold level for character conversion is set to 180 (in decimal notation), data 0, 35, 70, 115, 120 and 150 smaller than 180 are converted to "0", while 200, 235, 240, 250, 252 and 254 larger than 180 are converted to "1". FIG. 14 shows average information LA and gradation width information LD, and code information $\phi_{ij}$ for each pixel for the three blocks shown in FIG. 13 obtained by block truncation coding after the character attribute conversion. Thus, the combination of average information LA and gradation width information LD in the image blocks which are encoded is limited to the following three types of all white, all black and mixture of black and white.

1) All white: LA=255, and LD=0.
2) All black: LA=0, and LD=0.
3) Mixture of black and white:
    LA=127, and LD=127.

Further, it is found that the code information $\phi_{ij}$ is all zero except the mixture of black and white. FIG. 15 shows code information obtained by secondary encoding on the block truncation coding data shown in FIG. 14. Then, the first block is all encoded to a 2-bit mode data "01" (in two-bit representation) which designates black, and the third block is all encoded to a 2-bit mode data "00" which designates white. On the other hand, the second block is encoded to a 2-bit mode data (in two-bit representation) which designates mixture of black and white and to 1-bit information of each pixel which represents black or white, that is, two bytes of "33" and "33" (HDC notation).

FIG. 16 shows a character image recovered to the original pixel data from the code data shown in FIG. 15 obtained by secondary encoding. Though an edge of the character image read with the scanner has a gradient, problems such as noises and white dropping-out does not occur at edges, in contrast to the comparison example shown in FIG. 12.

Figure 17:
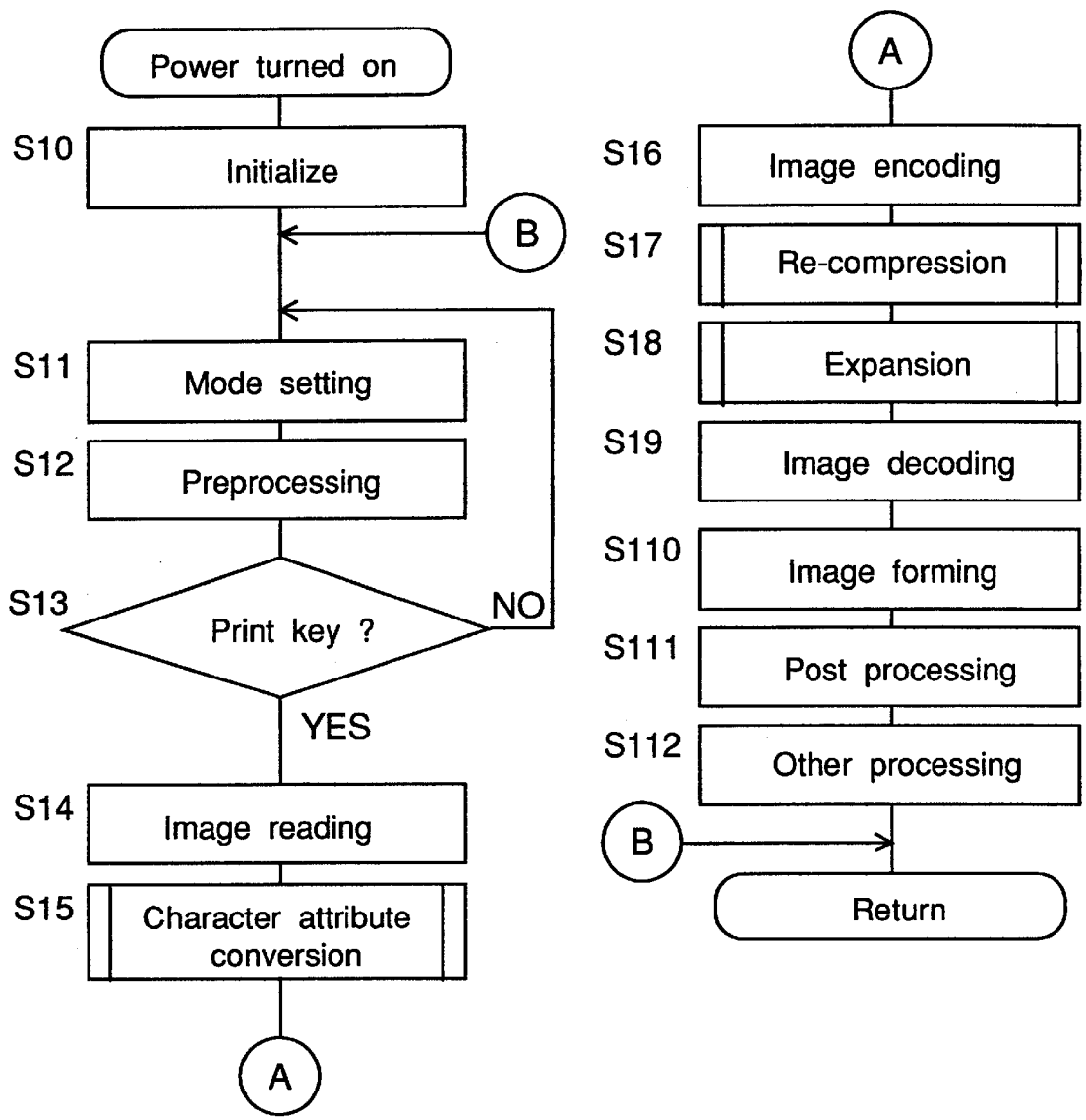
FIG. 17 is a flowchart of a main routine of copying by the copying machine.

FIG. 17 is a flowchart of a main routine of the CPU 611 to control the entire copying machine. First, internal variables necessary for controlling the image processing apparatus and elements provided therein are initialized (step S10). Next, a user sets an operation mode (step S11). Then, preprocessing is performed such as shading processing for image reading and preparation of elements provided for image forming (step S12). The steps S11 and S12 are repeated until print key in an operational panel (not shown) is pressed. If the print key is decided to be pressed (YES at step S13), image reading is performed according to the mode set at step S11 by controlling the image reader and the image processor (step S14).

Figure 18:
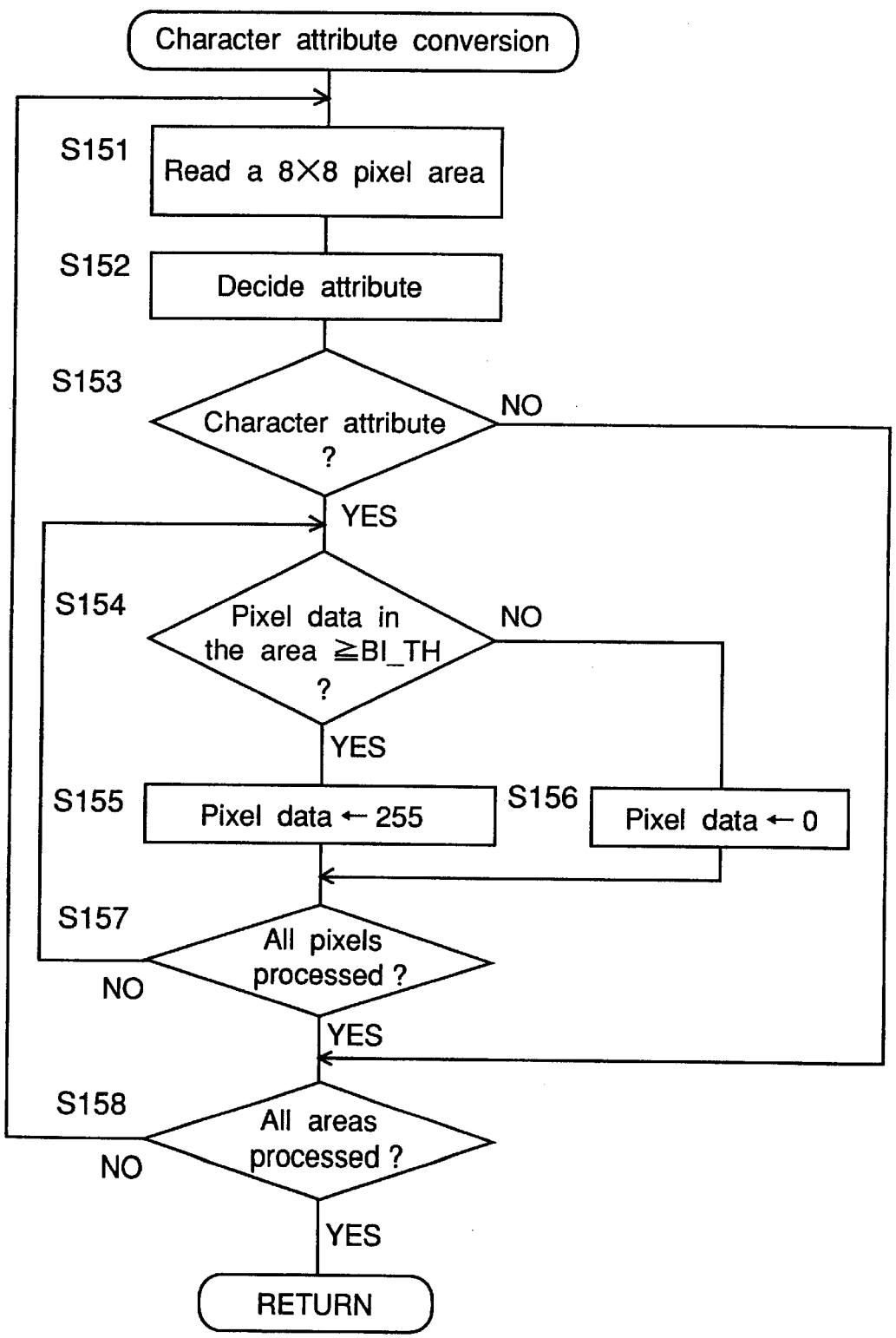
FIG. 18 is a flowchart of conversion of character attribute.

Next, character attribute conversion is performed (step S15, refer to FIG. 18). In the character attribute conversion, the read image data are divided into areas each consisting of 8*8 pixels, and attribute of an area is decided to be character or non-character (or half-tone). When the attribute of the area is character, the read image data are binarized. Further, the result of attribute decision is stored in an attribute map memory. The size of an area is 8*8 pixels in this embodiment, but it is not limited to 8*8 pixels.

For character areas, the image data that have been subjected to the above-mentioned character attribute conversion, while for the other areas, the original image data are subjected to image encoding in order to compress them to be stored in a memory (step S16). The term of image encoding means not encoding itself, but presetting of compression conditions, processing of data after compression and the like. The encoding itself is performed by a hardware circuit.

Figure 19:
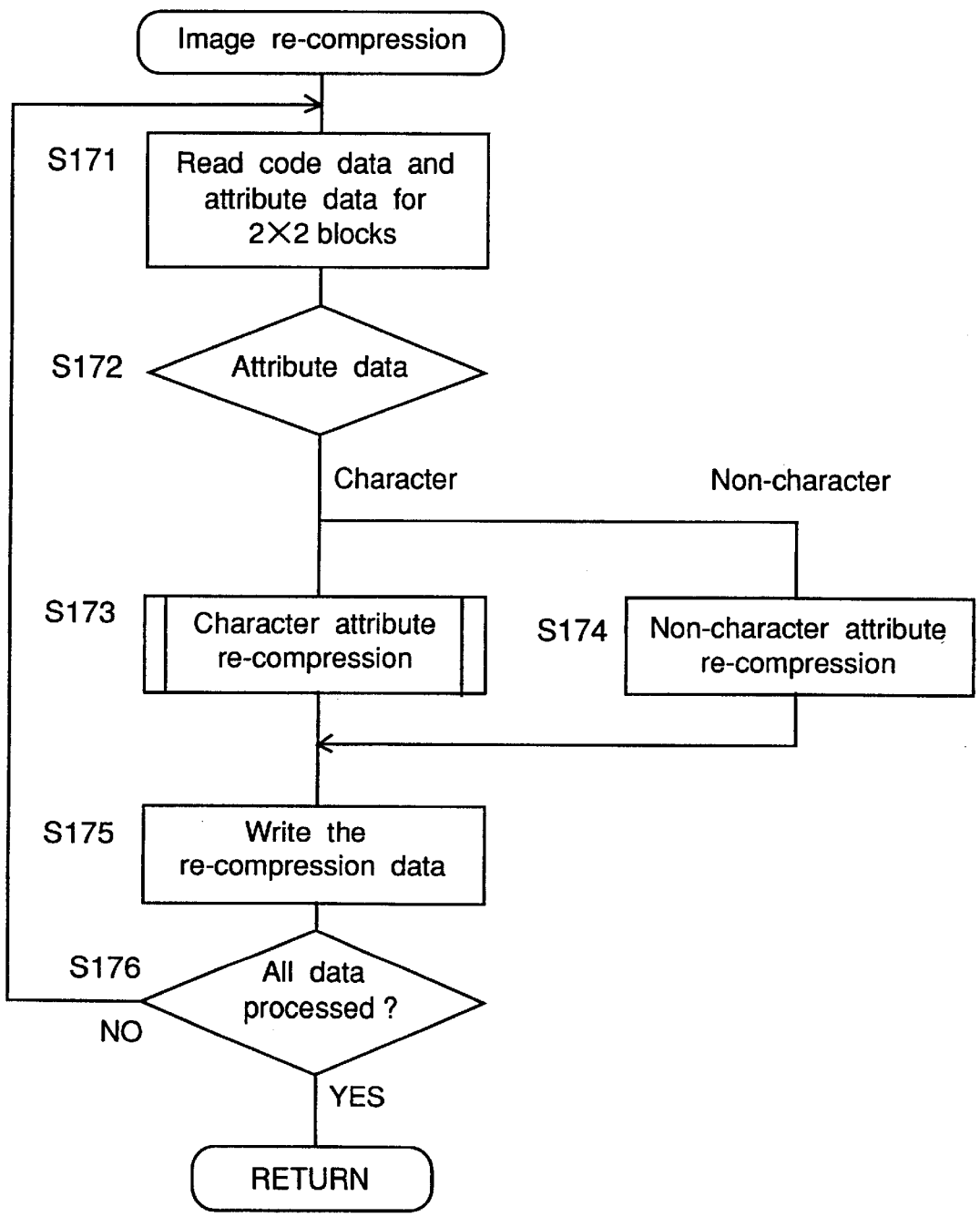
FIG. 19 is a flowchart of recompression for an image.

The compressed image data are further subjected to secondary encoding (re-compression) appropriately according to the attribute, and the re-compressed data are written to a memory (step S17, refer to FIG. 19).

Figure 20:
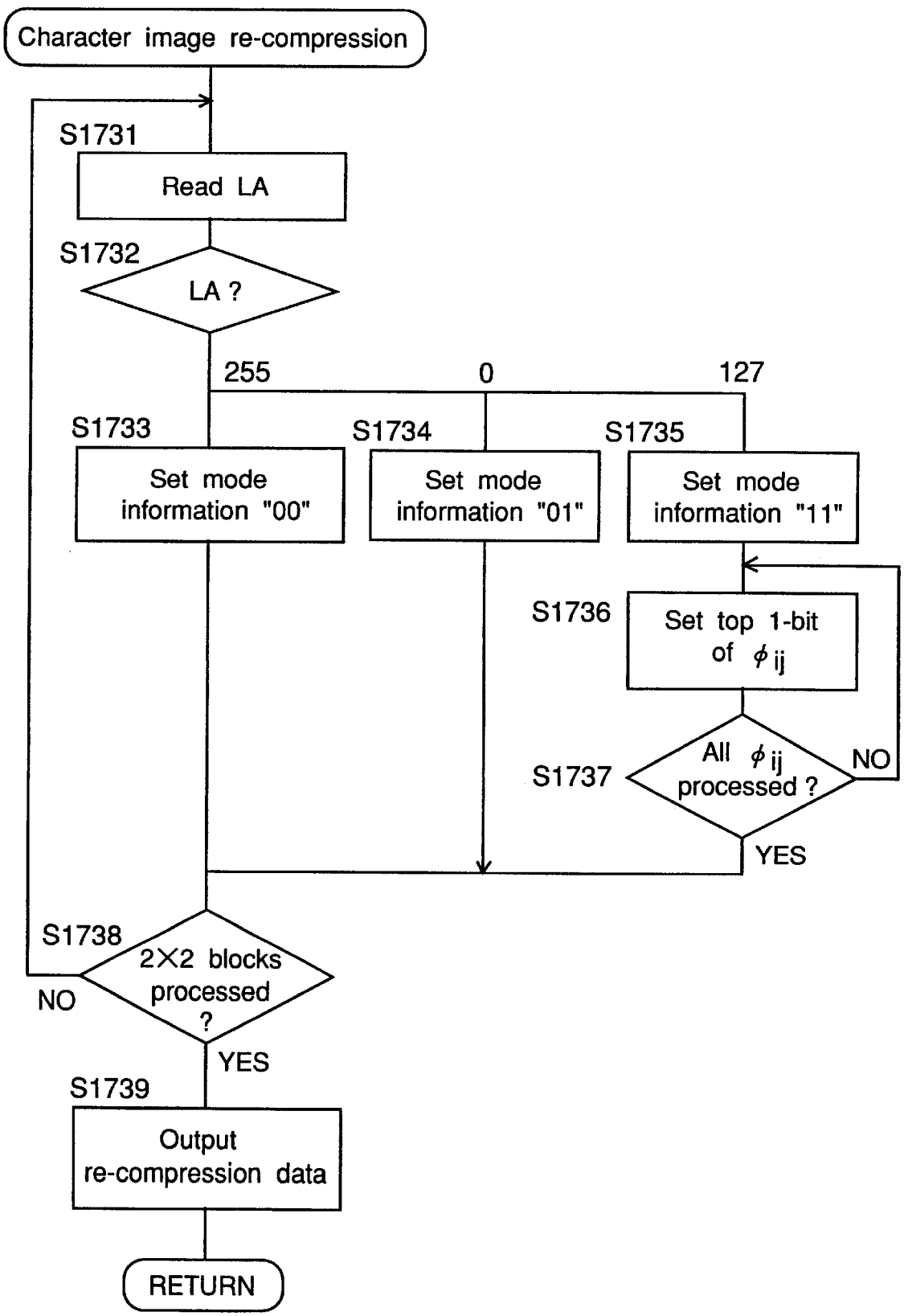
FIG. 20 is a flowchart of recompression for character attribute.

When an image is recovered, the re-compressed data are read for expansion (step S18, refer to FIG. 20). The above-mentioned re-compression (step S17) and the expansion (step S18) themselves are performed with software. Then, image decoding is performed (step S19). The image decoding is basically reverse to the above-mentioned image encoding (step S16) because the encoded image data are decoded to data which can be printed by the printer.

Next, the electrophotographic process such as charging, exposure, development and fixing is controlled for visualizing image data (step S20). Next, post-processing for the electrophotographic process is performed for maintaining the conditions of the apparatus such as for cleaning the photoconductor after image forming that does not directly related to the image forming (step S21). Finally, temperature control for the fixing device, communication control and the like are performed that are not directly related to the above-mentioned control (step S22). The above-mentioned steps are repeated until the electric power is turned off.

FIG. 18 is a flowchart of the character attribute conversion (step S15 in FIG. 17), wherein the read image data are divided into areas each consisting of 8*8 pixels, and if an area has character attribute, pixel data in the area are converted to 0 or 255 by using a threshold value. First, an area of 8*8 pixels is obtained from the read image data (brightness data L* and chromaticity data a* and b*) (step S151). Then, it is decided based on the image data of the area whether the area has character attribute (black character attribute in this embodiment) or non-character attribute (step S152). Next, it is decided whether the attribute of the area is character attribute or not (step S153). If the attribute of the area is character attribute, a pixel data in the area is compared with a threshold BI_TH ("127" in decimal notation in this embodiment) (step S154). If the pixel data is equal to or larger than BI_TH, the pixel data is converted to white reflectivity data ("255" in decimal notation in this embodiment) which represents white ground (step S155). On the other hand, if the pixel data is smaller than BI_TH, the pixel data is converted to black reflectivity data ("0" in decimal notation in this embodiment) where represents black character (step S156). The above-mentioned binarization (steps S154–156) is repeated on all the pixel data included in the block (step S127). The threshold BI_TH is set to a fixed value of "127" in the embodiment, but it can be set freely. In a different way, because a histogram or the like on the pixel data has a two-peak distribution of character and background of the character, the threshold BI_TH may be determined based on the two peaks. The above-mentioned steps are repeated on all the areas (step S158) by returning to step S151.

FIG. 19 is a flowchart of the re-compression (step S17 in FIG. 17). In the re-compression, after the attribute is determined for an area, the encoded data of the area obtained by block truncation coding are compressed again according to the attribute as will be explained below.

First, for an area of 8*8 pixels including 2*2 blocks, the encoded data obtained by block truncation coding, that is, average information LA, gradation width information LD and code information $\phi_{ij}$ of brightness and chromaticity, and the attribute information are read (step S171). Then, the flow branches according to the attribute data (step S172). If the attribute of the 2*2 blocks is decided to be character attribute, re-compression for character image is performed on the encoded data of the 2*2 blocks (step S173, refer to FIG. 20). On the other hand, if the attribute of the 2*2 blocks is decided to be non-character attribute, re-compression for non-character image is performed on the encoded data of the 2*2 blocks (step S174). Then, the data obtained by the re-compression for each attribute are written to a memory (step S175).

In the above-mentioned re-compression for non-character image (step S174), it is decided further whether the attribute is color or black-and-white, and the encoded data of chromaticity information a* and b* may be deleted, and only the data on the brightness information L* may be encoded again. In a different way, the gradation number (quantization level) for assigning code information $\phi_{ij}$ may be changed with the magnitude of gradation width information LD before the secondary encoding. (For example, if LD is large, two bits (four gradations) are assigned for $\phi_{ij}$, while if LD is small, one bit (two gradations) is assigned for $\phi_{ij}$.

FIG. 20 is a flowchart of the re-compression for character attribute (step S173 in FIG. 19). Because each pixel data in an area of 8*8 pixels is either "0" ("00" in hexadecimal notation) or "255" ("FF" in hexadecimal notation), a combination of average information LA and gradation width information LD of brightness L* in 2*2 blocks to be coded is limited to the following three types of all white, all black and mixture of black and white.

1) All white: LA=255, and LD=0.
2) All black: LA=0, and LD=0.
3) Mixture of black and white:
   LA=127, and LD=127.

Therefore, for the blocks of character attribute, by reading average information LA in the encoded data, it is decided whether the type of the block is all white, all black or mixture of black and white, and the gradation width information LD is determined to be "0" (for all white and for all black) or "255" (for mixture of black and white) according to the type of the encoded data. Further, the code information $\phi_{ij}$ (j=0, 1, . . . , 8) is "0" ("00" in two-bit representation) for each pixel if the type is all white or all black, while it is either "11" or "00" if the attribute is mixture of black and white. Then, it is sufficient for the secondary encoding only to use information which designates the three modes (2 bits for each area, or 1 byte for 2*2 blocks in the area), and upper one bit of the code information only for the type of mixture of black and white. Further, because information for chromaticity a* and b* are not necessary, average information LA, gradation width information LD and code information $\phi_{ij}$ thereof are not needed to be stored. As a result, it is sufficient for the secondary encoding only to use the 2-bit information for representing whether the 4*4 pixels in a block are all black, all white or mixture of black and white, and 2-byte code information (upper one bit of $\phi_{ij}$ for each pixel) only for the type of mixture of black and white. Then, the amount of information is reduced to 1/192–3/64 by the secondary encoding.

The procedure of the above-mentioned character attribute re-compression is explained below. First, 1-byte average information LA is read in the block truncation code data to determine character attribute (step S1731). Then, the flow branches according as the average information LA is all white (LA=255="FF"), all black (LA=0) or mixture of black and white (LA=127="7F") (step S1732).

If LA="FF", mode information which designates all white is output. That is, 2-bit data of "00" in binary notation is output for a code data for a block of the 4*4 pixels (step S1733). If LA="00", mode information which designates all black is output. That is, 2-bit data of "01" in binary notation is output for a code data in the 4*4 pixels (step S1734). If LA="7F", mode information which designates mixture of black and white is output. That is, 2-bit data of "10" in binary notation is output for a code data in the 4*4 pixels (step S1735). Further, 4-byte code information $\phi_{ij}$ of block truncation data are read, and only upper bit of each 2-bit code data is output (step S1736). The output of 1-bit data is repeated on all data in the code information $\phi_{ij}$ (Step S1737) so as to output 2-byte data for the code information.

Then, the flow returns to step S1731 to repeat the above-mentioned processing according to the attribute on the three types of modes until all the encoded data for the 2*2 blocks (or 8*8 pixels) are processed (YES at step S1738). Then, the result (that is, the mode information and the code information) obtained by the re-compression is output to be stored in the memory device such as a hard disk (step S1739). Thus, the memory device stores one byte (2 bits times four) which represents mode information of the encoded data of the 2*2 blocks and two bytes for a block which represent the code information only for the blocks of mode information of mixture of black and white.

Figure 21:
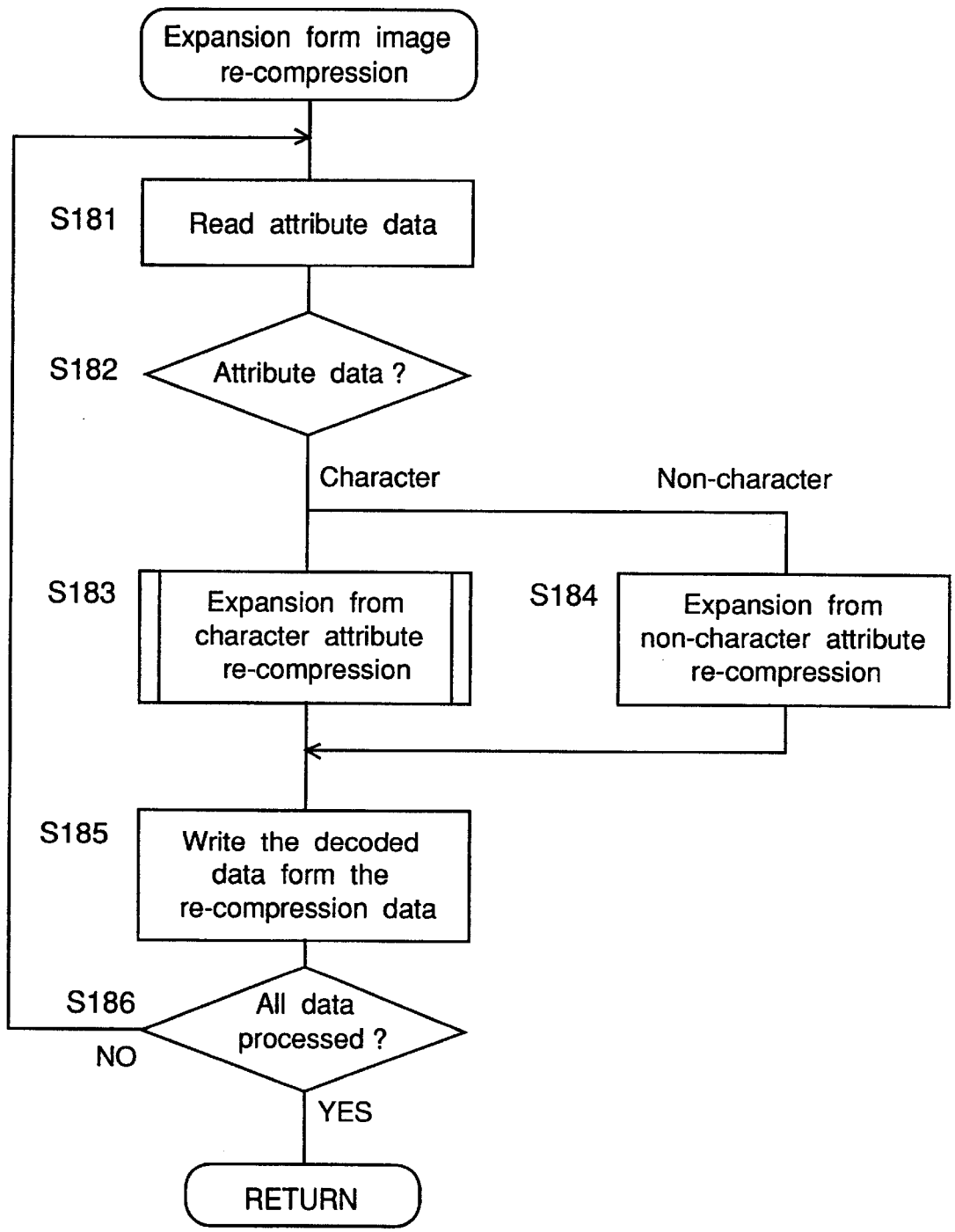
FIG. 21 is a flowchart of decoding from recompression for image.

FIG. 21 is a flowchart of the expansion from the re-compressed data (step S18 in FIG. 17) for expanding the compressed data encoded and written to the memory device according to the re-compression explained above with reference to FIG. 20. In this processing, expansion method is changed according to the attribute of a block of character or non-character, as will be explained below.

First, the attribute data is read (step S181). Thus, it is found based on the attribute data whether the attribute of the re-compressed data to be read is character image or non-character image. Then, the flow branches to various expansion methods according to the attribute data (step S182). If the attribute data is character image attribute, expansion from the re-compressed data of character image is performed (step S183, refer to FIG. 22), while if the attribute data is non-character image attribute, expansion from the re-compressed data of non-character image is performed (step S184). Then, 6-byte decoded data obtained with the expansion for each attribute are written to the memory for L*, a* and b* (step S185). Then the flow returns to step S181 to repeat the expansion procedure explained above until all the blocks is processed (YES at step S186).

The expansion for non-character image (step S184) is performed on the re-compressed data of non-character image obtained at step S174 in FIG. 19. For example, it is decided that the image is a color image or a black-and-white image, and for a black-and-white image, only the brightness information L* is stored. In such a case, only the information is read, and the code data for chromaticity data of a* and b* are assigned to zero (that is, LA=0, LD=0, $\phi_{ij}$=0) for the block truncation coding data. If the gradation number is changed according to the magnitude of gradation width information LD for the secondary encoding or 2, 1 or 0 bit is assigned for each $\phi_{ij}$, when the expansion is performed, the data is converted to 2-byte code information (or 2-bit for each $\phi_{ij}$) for the block truncation coding data according to the magnitude of gradation width information LD as follows. If the bit number determined according to the magnitude of LD is 2, the as-received data is used. If the bit number is 1, the code data is set to "00" in binary notation if $\phi_{ij}$=0, while it is set to "11" if $\phi_{ij}$=1. If the bit number is 0, the code data is set to "00" in binary notation.

Figure 22:
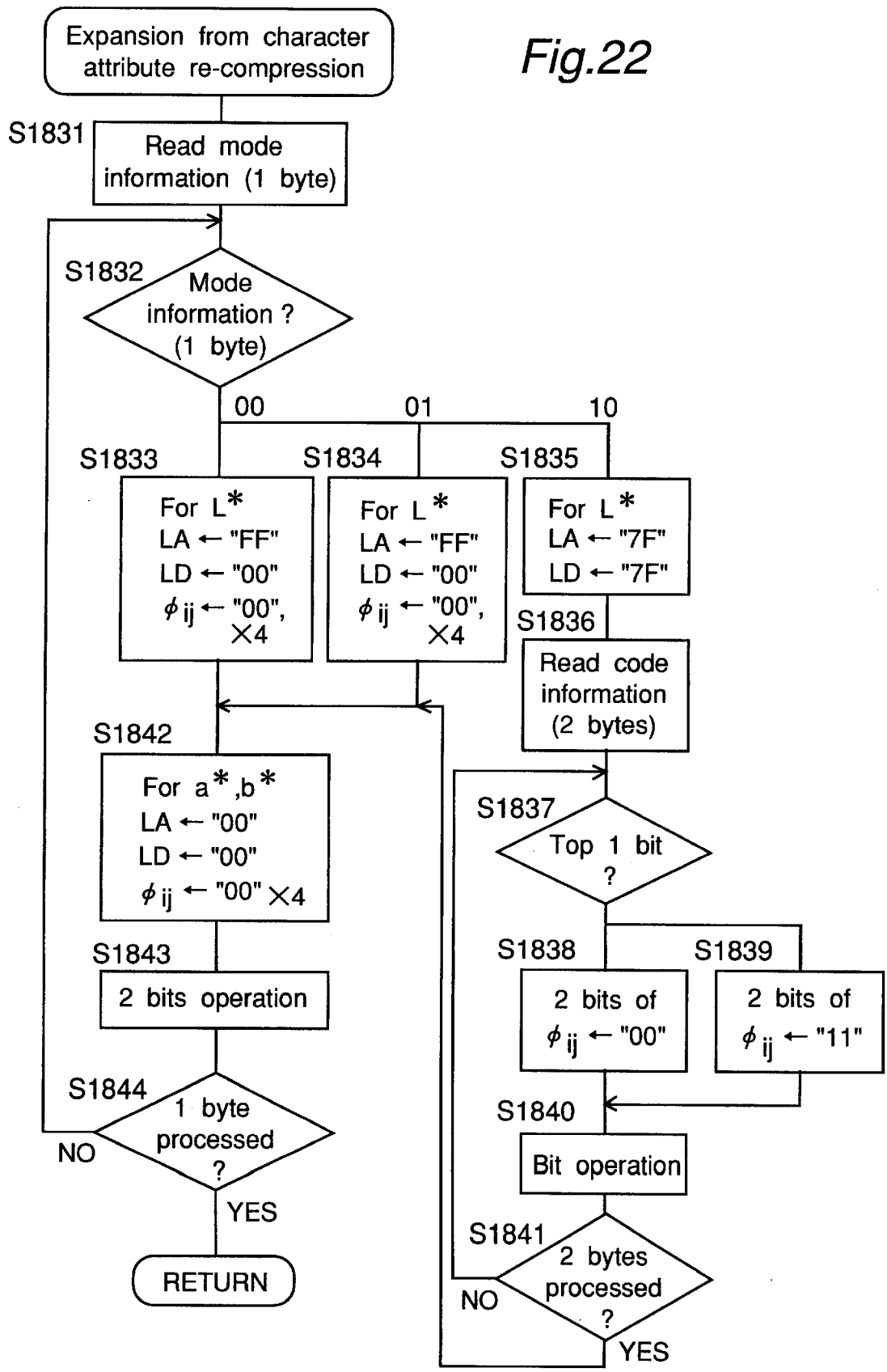
FIG. 22 is a flowchart of recompression for character attribute.

FIG. 22 is a flowchart of decoding from the re-compressed data of character attribute (step S183 in FIG. 21). A block has been decided to have character attribute according to the attribute data before the decoding. Further, as one attribute is assigned for an area of 8*8 pixels, the code data used for the attribute includes four data for the four blocks. Then, one byte (two bits times four) is read from the re-compressed data to find which mode in the three of all white, all black and mixture of black and white the four code data belong to (step S1831). Then, top two bits are read from the 1-byte mode data to decide whether the bits are "00" (all white), "01" (all black) or "10" (mixture of black and white) (step S1832).

If the top two bits are "00", the block of 4*4 pixels has the mode of all white. Then, the code data for L* are processed to generate decoded data used for decoding from 6-byte block truncation coding data as follows (step S1833). Average information LA="FF" (in hexadecimal notation) or 255 (in decimal notation) of 1 byte. Gradation width information LD="00", (in hexadecimal notation) or 0 (in decimal notation) of 1 byte. Code information $\phi_{ij}$="00" (in hexadecimal notation) or 0 (in decimal notation) times four of 4 bytes.

If the top two bits are "01", the block. of 4*4 pixels has the mode of all black. Then, the code data for are processed to generate decoded data as follows (step S1834). Average information LA="00" (in hexadecimal notation) or 0 (in decimal notation) of 1 byte. Gradation width information LD="00" (in hexadecimal notation) or 0 (in decimal notation) of 1 byte. Code information $\phi_{ij}$="00" (in hexadecimal notation) or 0 (in decimal notation) times four of 4 bytes.

If the top two bits are "10", the block of 4*4 pixels has the mode of mixture of black and white. Then, the code data for L* are processed to generate decoded data as follows (step S1835). Average information LA="7F" (in hexadecimal notation) or 127 (in decimal notation) of 1 byte. Gradation width information LD="7F" (in hexadecimal notation) or 127 (in decimal notation) of 1 byte. Further, if the top two bits are "10", two bytes of code data which represent black or white of each pixel are read (step S1836).

Then, it is decided whether the top one bit in the byte is "0" or "1" (step S1837). If it is "0", the code information $\phi_{ij}$ of the pixel is set to "00" in binary notation (step S1838). On the other hand, if it is "1", the code information $\phi_{ij}$ of the pixel is set to "11" in binary notation (step S1839).

The one-byte code information read at step S1836 is shifted by one bit to set the next bit to the top (step S1840).

Then, the flow returns to step S1837, to repeat the above-mentioned processing.

The above-mentioned processing for generating 2-bit $\phi_{ij}$ for each pixel from the top 1-bit of the code information is repeated until the two bytes are processed completely sixteen times. Thus, four bytes of code information $\phi_{ij}$ in block truncation coding data to be decoded are generated (step S1841).

Further, 6-byte data for each of chromaticity a and b* used for decoding from block truncation coding data are obtained as follows (step S1842). Average information LA="00" (in hexadecimal notation) or 0 (in decimal notation) of 1 byte, gradation width information LD="00" (hexadecimal notation) or 0 (in decimal notation) of 1 byte, and code information $\phi_{ij}$="00" (in hexadecimal notation) or 0 (in decimal notation) of 4 bytes. The 6-byte decoded data for each of L*, a* and b* are written to the memory as the decoded data for the mode.

Then, the 1-byte mode data is shifted by two bits in order to determine the mode information for the next block (4*4 pixels) (step S1843), and the flow returns to step S1832 to repeat the above-mentioned processing for the block.

The above-mentioned processing is repeated until one byte of the mode data have been processed, that is, until the four blocks of 4*4 pixels have been processed (step S1844).

Thus, 72 bytes (4 blocks times 6 bytes times 3 of L*, a* and b*) are obtained for the 8*8 pixels from 1 to 9 bytes of the re-compressed data for brightness information L*, chromaticity information a* and b* as the data to be decoded with block truncation coding.

In the above-mentioned apparatus, high coding rate can be realized without deteriorating image quality even for an edge portion with a sharp gradient of character image which is read with a scanner to have a relatively gentle gradient. In the processing, block truncation coding is performed after binarizing the brightness information. Thus, code data can be biased efficiently, and by using secondary encoding for the biased data for blocks of character attribute, high coding rate can be realized without deteriorating image quality.

Further, when the block truncation coding data of average information, gradation width information and code data for brightness information L*, chromaticity information a* and b* are subjected to the secondary encoding, only average information, gradation width information and code data necessary for each attribute are encoded. Therefore, a high compression ratio can be realized without using a complicated circuit including a bi-level encoder for character attribute and a multi-level encoder for non-character attribute.

Still further, the secondary encoding is performed after block truncation coding by correlating the average information, gradation width information and code data of fixed length. Therefore, image processing such as rotation, enlargement or reduction can be performed easily for the code data.

Next, a digital color copying machine of a second embodiment is explained. The copying machine is similar to that of the first embodiment in a point that image data are subjected to both block truncation coding and secondary encoding, but the contents of the block truncation coding and secondary encoding are different. Because a structure and image processing of the copying machine of this embodiment are similar to the counterparts of the first embodiment shown in FIGS. 1 and 2, only different points are explained for the briefness of the explanation.

Figure 23:
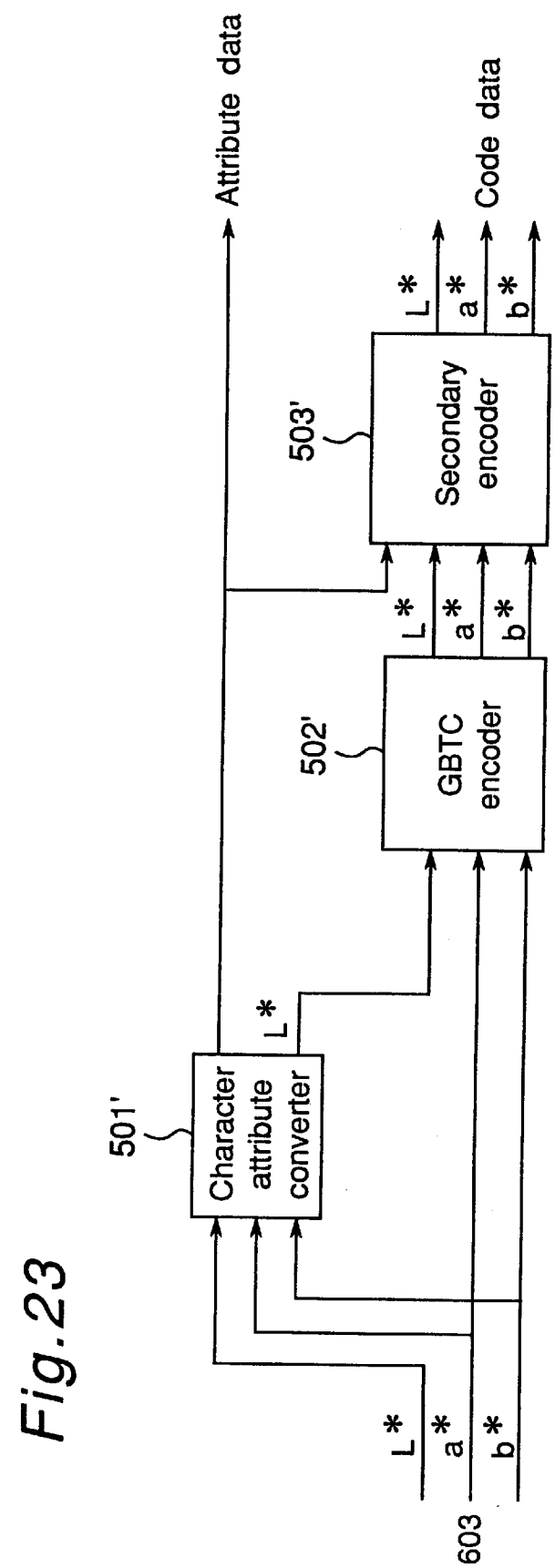
FIG. 23 is a block diagram of an encoding section of an encoder/decoder in a second embodiment of the invention.

Encoding of image data with block truncation coding in the coder/decoder 604 (FIG. 2) is encoded performed as will be explained below. FIG. 23 shows an encoding section of the encoder/decoder 604. For an image mixed with character portions (black-and-white bi-level portions, black uniform density portions, and white uniform density portions) and non-character portions (photograph portion or the like), image data are obtained as density data or, for a color image, brightness data and chromaticity data. Color image data read with the image reading apparatus 100 are separated to lightness data and chroma data by the color space converter 602 (FIG. 2). Each of the brightness data and chromaticity data is divided into areas of N*M pixels (N and M are integers), and it is decided based on the data in an area whether the attribute is character or non-character. The area is larger than the block for block truncation coding. In this embodiment, the area consists of 8*8 pixels while the block consists of 4*4 pixels. A character attribute converter 501' receives brightness information L* and chromaticity information a and b from the color space optimizer 603 (FIG. 2) before block truncation coding. The character attribute converter 501' decides attribute of character or non-character in the above-mentioned unit (say area of 8*8 pixels), and one attribute data is output for the area of 8*8 pixels. If the area has character attribute, the density data (or brightness data for color image) are converted to binarized data according to the character attribute conversion processing which will be explained later with reference to FIG. 24. That is, character information (black characters in white ground) and character background information ("character background" means ground) are calculated, and the density data (or brightness data for color image) are replaces with one of two densities of character information and character background information. A result obtained by the character attribute converter 501' is stored as attribute data in the memory.

Next, a block truncation coding (GBTC) encoder 502' performs block truncation coding in the unit of block (for example 4*4 pixels) on all the image data in order to reduce the amount of information. That is, the chromaticity information a* and b* received from the color space optimizer 603 and the brightness information L* received from the character attribute converter 501' are encoded in the unit of a block of 4*4 pixels. Thus, 16-byte information is encoded to 6 bytes (average information LA, gradation width information LD and code information $\phi_{ij}$). Then, the encoded data are stored in the compression image memory section 610.

Next, a secondary encoder 503' performs secondary encoding from the attribute data received from the character attribute converter 501' and the code data received from the GBTC converter 502'. The result of attribute decision is read again, and the secondary encoding is performed according to the attribute. That is, only necessary information in the encoded data for 2*2 blocks (8*8 pixels) received from the GBTC encoder 502' is output according to the attribute data of character or non-character for the blocks, so as to remove unnecessary information. In the secondary encoding for blocks of character attribute, the code data are classified into three types of all character (all character mode), all character background (all character background mode) and mixture of character and character background (mixture mode) according to the average information and the gradation width information obtained in block truncation coding. Then, the encoder 503' stores it as mode information and performs secondary encoding according to the mode information as follows.

(A) The character density and the background density each of one byte for the block are output.
(B) When the average information of GBTC data is equal to the character information, mode information (two bits) which represents all character information is output.
(C) When the average information of GBTC data is equal to the background information, mode information (two bits) which represents all background information is output.
(D) When the average information of GBTC data is not equal to either of the character information and the background information or equal to (the character information+the background information)/two, mode information (two bits) which represents mixture of character and background and the code data of GBTC data are output.

Thus, in the secondary encoding, the character information, the ground information and the mode information, and the code information (one bit per pixel) in GBTC data for mode information of mixture of character and ground are stored for the areas of character attribute.

Thus, the amount of information is reduced further by the secondary encoding. For example, one area on which the attribute is decided consists of 8*8 pixels, and one block consists of 4*4 pixels. That is, one area includes four blocks. For the area of character attribute, data to be stored include the character information (1 byte), the ground information (1 byte) and the mode information (2 bits), and only for the mode information of mixture of character and ground, the code information (1 bit per pixel). Thus, the original 64-byte data (or 192 byte-data for color image) are reduced to 3–11 bytes. On the contrary, in the prior art block truncation coding, the amount of data is 16 bytes for the area (if the number of gradation levels is two). Further, when the data are decoded, the character information and the ground information of the original character image can be reproduced, and good image quality can be obtained.

A decoding section of the encoder/decoder 604 is similar to the counterpart in the first embodiment shown in FIG. 7. Then, it is not explained here.

A main routine of the CPU 611 to control the entire copying machine is similar to the counterpart of the first embodiment shown in FIG. 17. However, the contents of some steps are different from the counterparts shown in FIG. 17, and only different portions are explained below.

Figure 24:
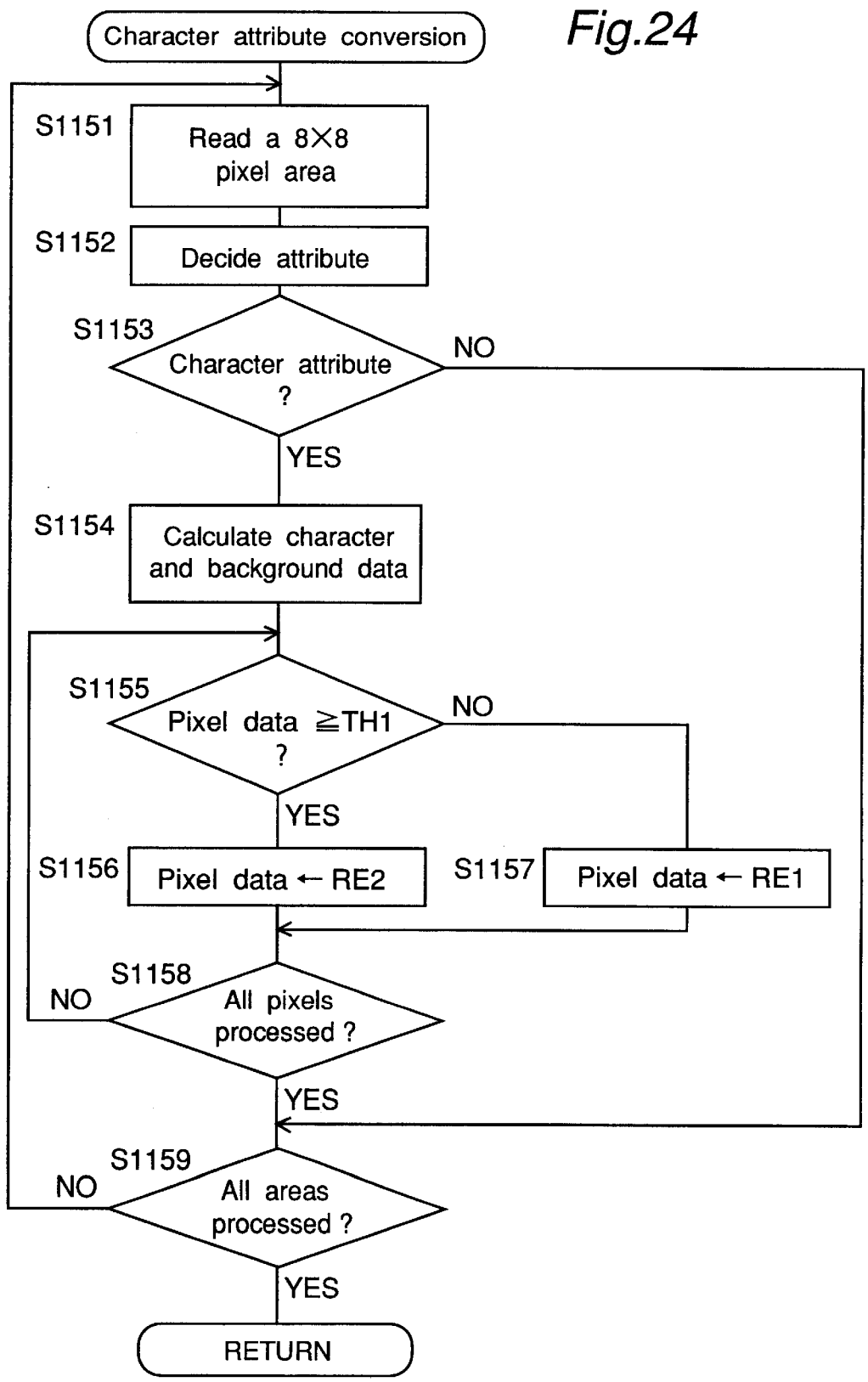
FIG. 24 is a flowchart of character attribute conversion.

FIG. 24 is a flowchart of the character attribute conversion (step S15 in FIG. 17). In this flow, the read image data are divided into areas each consisting of 8*8 pixels. For an area of character attribute, black character density (or reflectivity in this embodiment) or ground density (or reflectivity in the embodiment) in the background of the black character are determined, and the pixel data in the area are replaced with one of the two densities.

First, an area of 8*8 pixels is obtained from the read image data (brightness data L* and chromaticity data a* and b*) (step S1151). Then, it is decided based on the image data of the area whether the area has character attribute (black character attribute in this embodiment) or non-character attribute (step S1152).

Next, the flow branches according to the attribute (step S1153). If the attribute is character attribute, a histogram on all the pixels in the area is calculated, and both black character reflectivity RE1 and ground reflectivity RE2 are determined based on two peaks in the histogram (step S1154), wherein the character data and the ground data are represented as reflectivity. Next, a pixel data in the block is compared with a threshold TH1 calculated as TH1=(RE1+RE2)/2 (step S1155). If the pixel data is equal to or larger than TH1, the image data is replaced with ground reflectivity data RE2 which represents ground density (step S1156). If the pixel data is smaller than TH1, the image data is replaced with black reflectivity data RE1 which represents black character (step S1157). Next, the flow returns to step S1155 to repeat the above processing on all the pixel data in the area.

If all the pixel data has been processed (YES at step S1158), the flow returns to step S1151 to repeat the above-mentioned processing until all the area has been processed (YES at step S1159).

Figure 25:
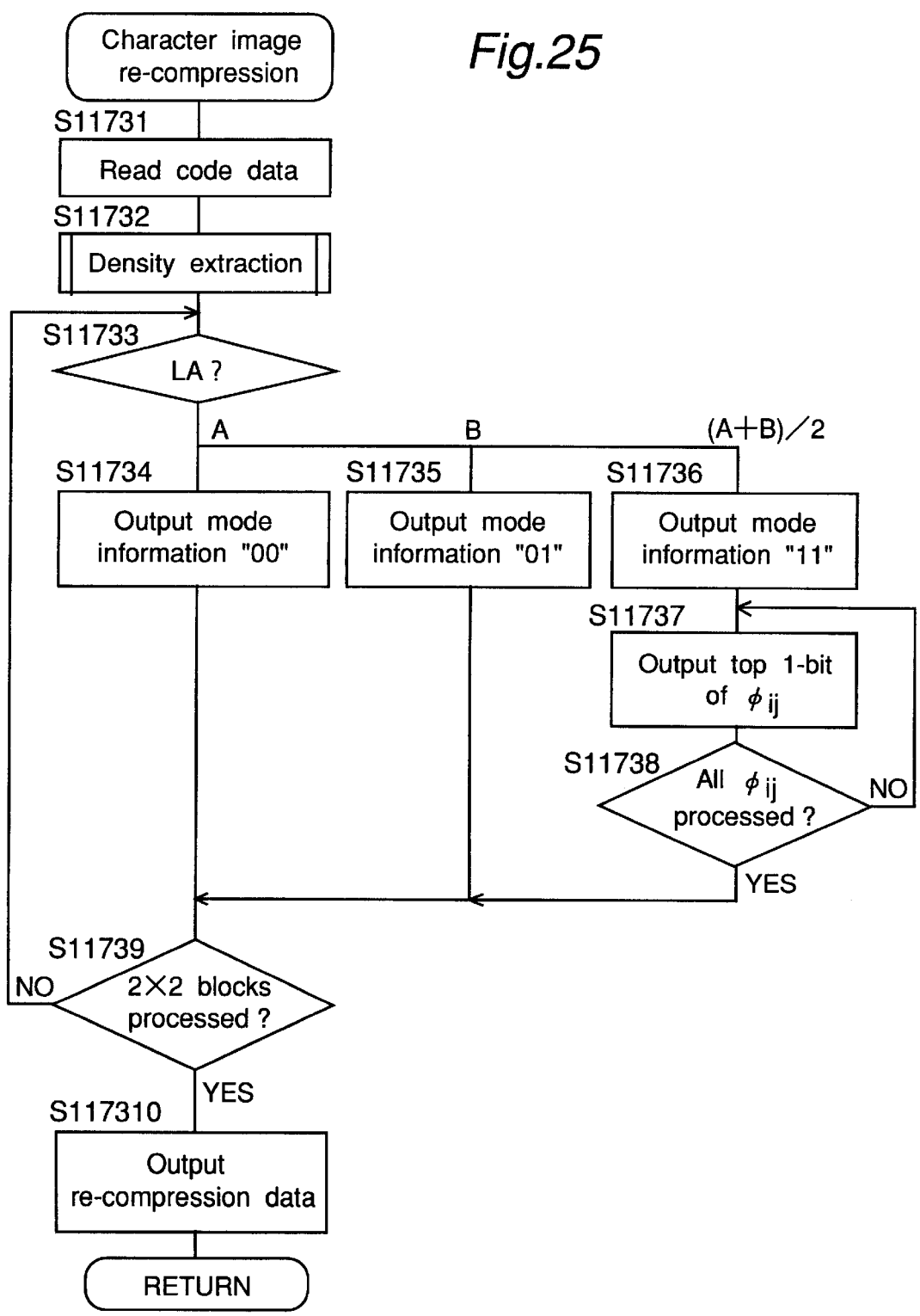
FIG. 25 is a flowchart of re-compression of image for character attribute.

FIG. 25 is a flowchart of the recompression for character attribute (step S173 in FIG. 19). Each pixel data in a block is either character data RE1 or background data RE2. Therefore, a combination of average information LA and gradation width information LD of brightness L* in a block to be encoded is limited to the following three types of all RE1, all RE2 and mixture of RE1 and RE2.

1) All RE2: LA=RE2, and LD=0.
2) All RE1: LA=RE1, and LD=0.
3) Mixture of RE1 and RE2:
    LA=(RE2+RE1)/2, and LD=RE2-RE1.

Therefore, by reading average information LA in the encoded data for a block of character attribute, it is decided whether the type is all RE1, all RE2 or mixture of RE1 and RE2. It is also apparent for 2*2 blocks having one attribute that if the gradation width information LD is zero, the average information LA is determined to be RE1 or RE2. Further, if the type of the 2*2 blocks is mixture of RE1 and RE2, the average information and the gradation width information for the four blocks are equal to each other, and RE1 and RE2 can be calculated simply from the average information LA and the gradation width information LD.

$$RE1 = LA - LD/2,$$

and $$RE2 = LA + LD/2.$$

Further, the code information $\phi_{ij}$ (i, j=0, 1, ..., 8) is "0" ("00" in two-bit representation) for each pixel if the type is all RE1 or all RE2, while it is either "11" or "00" if the type is mixture of RE1 and RE2. Then, it is sufficient for the secondary encoding only to use the information for representing the three modes (2 bits for each block, or 1 byte for 2*2 pixel blocks), and upper one bit of the code information only for the type of mixture of RE1 and RE2. Further, because information for chromaticity a* and b* are not necessary if the attribute is black character (white background), average information LA, gradation width information LD and code data $\phi_{ij}$ thereof are not needed to be stored. As a result, it is sufficient for the secondary encoding only to use 2-bit information for representing whether 4*4 pixels in a block are all RE1, all RE2 or mixture of RE1 and RE2, and 2-byte code information (upper one bit of $\phi_{ij}$ for each pixel only for the type of mixture of RE1 and RE2. Then, the amount of information is reduced to 1/192–3/64 by the secondary encoding.

The procedure of the above-mentioned re-compression for character attribute is explained below. First, 1-byte average information LA and 1-byte gradation width information LD in the block truncation code data are read for character attribute (step S11731). Next, for 2*2 blocks having character attribute, two density data A and B (A<B) for the block are determined by using the average information LA and the gradation density information LD with density extraction which will be explained later (refer to FIG. 26) (step S11732).

Then, the flow branches according as the average information LA (step S11733). If LA=A (or all code data are A), mode information which represents all white is output (step S11734). That is, 2-bit data of "00" in binary notation is output for a block (4*4 pixels). If LA=B (or all code data are B), mode information which represents all B is output (step S11735). That is, 2-bit data of "01" in binary notation is output for the block. If LA=(A+B)/2 (or mixture of A and B), mode information which represents mixture of A and B is output (step S11736) That is, 2-bit data of "10" in binary notation is output for the block. Further, if LA=(A+B)/2, 4 bytes of code information $\phi_{ij}$ in block truncation coding data for the block are read, and only upper one bit for each 2-bit code data is output in correspondence to code information for each pixel (step S11737). The output of top 1-bit is repeated until all code data $\phi_{ij}$ in the code information are processed (YES at Step S11738), so as to output 2-byte data for the code information.

Then, the flow returns to step S11733 to repeat the above-mentioned processing according to the attribute on the three types of modes until all the encoded data for the 2*2 blocks (or 8*8 pixels) are processed (YES at step S11739). Then, the result (that is, the two density data A and B, the mode information and the code information) obtained by the re-compression is output to be stored in the memory device such as a hard disk (step S117310). Thus, the memory device stores two bytes of the two density data A and B, and one byte (2 bits times four) which represents mode information for the 2*2 blocks, and only for the mode information of mixture of A and B, two bytes for one block which represent top one bit of the code information $\phi_{ij}$.

Figure 26:
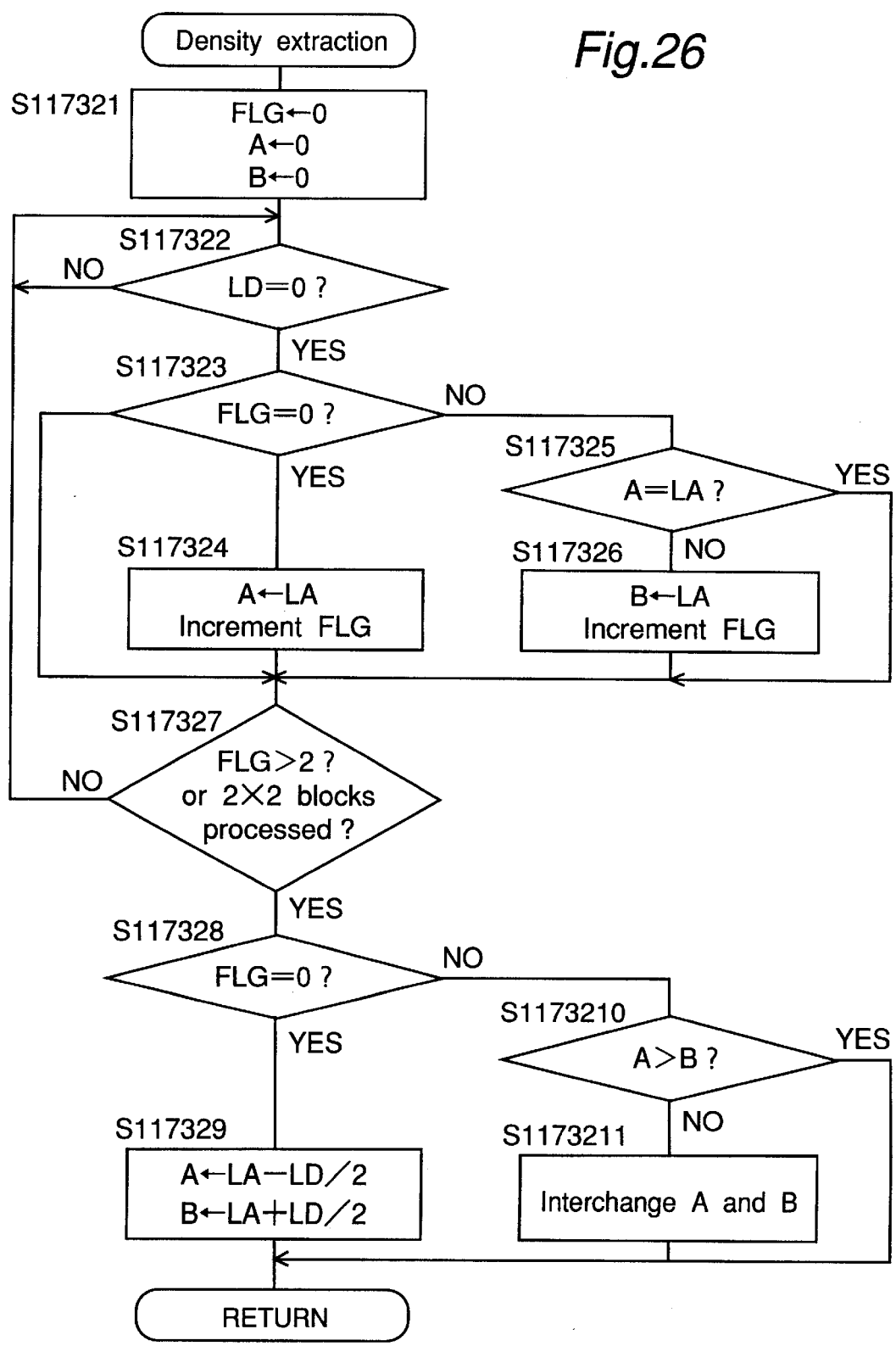
FIG. 26 is a flowchart of density extraction.

FIG. 26 is a flowchart of the density extraction (S11732 in FIG. 25) wherein the 1-byte two density data A and B (A<B) are determined. First, variables A and B for storing the two data are reset to 0, and a flag FLG which designates the storage of the two data is also reset to 0 (step S117321). Next, it is decided whether the gradation width information LD for a block to be processed in 2*2 blocks is 0 or not (step S117322). If LD 0, it is decided next whether the flag FLG is 0 or not (step S117323). If FLG=0 or the data of either A or B is not stored, the current LA is stored in the variable A, and the flag FLG is incremented (step S117324). On the other hand, if FLG≠0 (NO at step S117323), and if LA≠A (YES at step S117325), the current LA is stored in the variable B, and the flag FLG is incremented (step S117326). The flow returns to step S117322 to repeat the above-mentioned processing until the flag FLG exceeds 2 or until all the LD data for the 2*2 blocks (or 8*8 pixels) are processed (YES at step S117327).

Next, it is decided whether the flag FLG is 0 or not (step S117328). If FLG is still 0, any gradation width information in the 2*2 block is not 0, and a result of the following calculation with use of LA and LD is stored in the variables A and B (step S117329).

$$A \Leftarrow LA - LD/2$$

$$B \Leftarrow LA + LD/2$$

On the other hand, if FLG is not 0 (NO at step S117328), and if A>B (YES at step S1173210), the data in the variables A and B are interchanged (step S1173211), to make B always larger than A. Thus, the two density data A and B (A<B) are extracted from the block truncation coding data.

Figure 27:
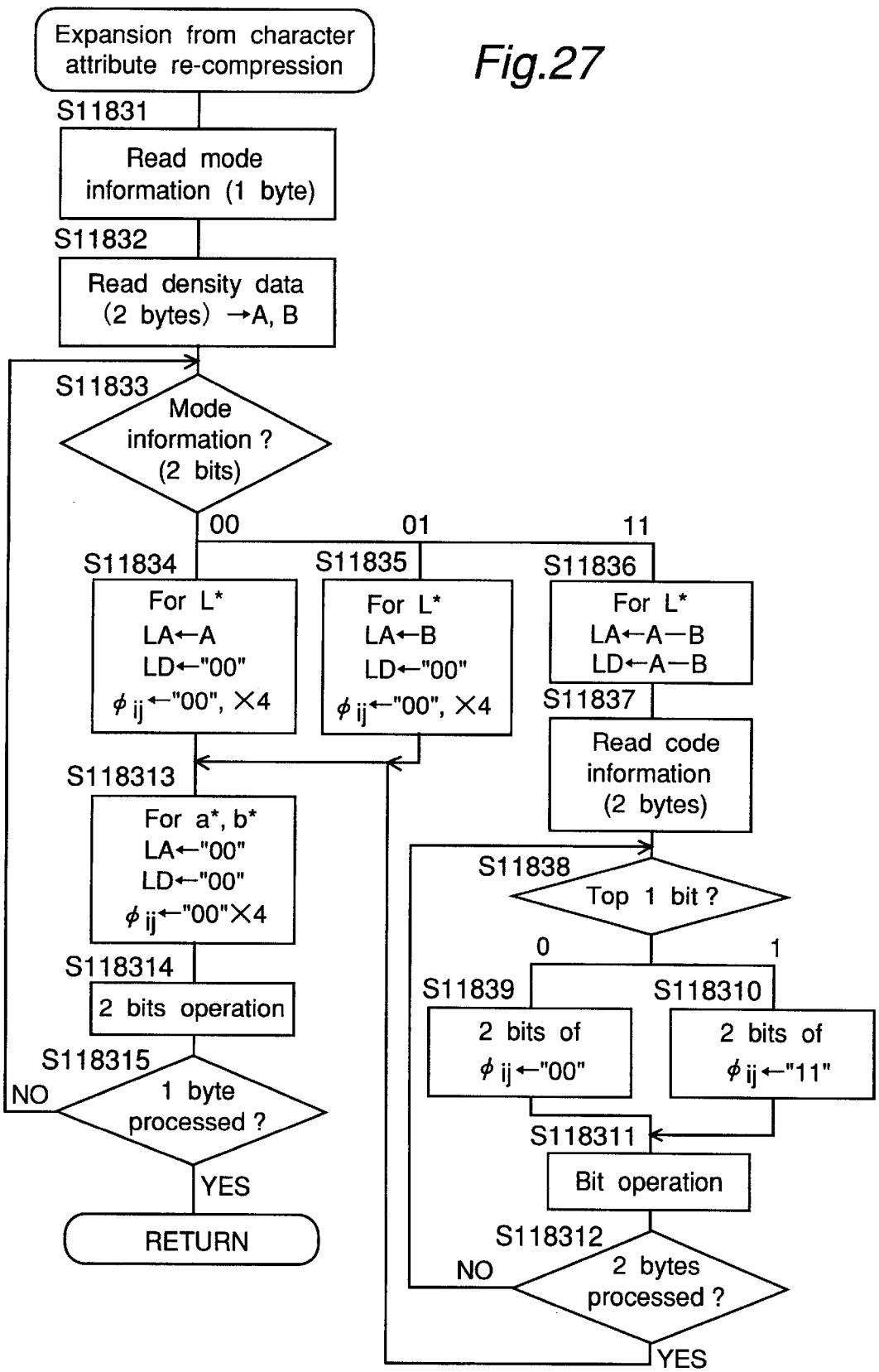
FIG. 27 is a flowchart of expansion from re-compressed data for character attribute.

FIG. 27 is a flowchart of the expansion from re-compressed data for character attribute (step S183 in FIG. 21). A block under interest has been decided to have character attribute according to the attribute data. Because one attribute is assigned for 8*8 pixels of four blocks, four attribute data are included in the code data for block truncation coding for the four blocks. First, one byte (two bits times four) of mode information is read from the re-compressed data to find which mode in the three of all character, all background and mixture of character and background the four code data designate (step S11831). Further, the density data A and B for character and for background each of one byte are read (step S11832). Then, top two bits in the one-byte mode data are read to decide whether the bits are "00" (all A), "01" (all B) or "10" (mixture of A and B), and the flow branches according to the-mode information (step S11833).

If the top two bits are "00", the block of 4*4 pixels is all A. Then, the code data for L* are processed to generate decoded data for decoding from 6-byte block truncation coding data as follows (step S11834). Average information LA is set to A of 1 byte. Gradation width information LD is set to "00" (in hexadecimal notation) or 0 (in decimal notation) of 1 byte. Code information $\phi_{ij}$ is set to "00" (in hexadecimal notation) or 0 (in decimal notation) times four of 4 bytes.

If the top two bits are "01", the block of 4*4 pixels is all B. Then, the code data for L* are processed to generate decoded data for decoding from 6-byte block truncation coding data as follows (step S11835). Average information LA is set to B of 1 byte. Gradation width information LD is set to "00" (in hexadecimal notation) or 0 (in decimal notation) of 1 byte. Code information $\phi_{ij}$ is set to "00" (in hexadecimal notation) or 0 (in decimal notation) times four of 4 bytes.

If the top two bits are "10", the block of 4*4 pixels is mixture of A and B. Then, the code data for L* are processed to generate decoded data for decoding from 6-byte block truncation coding data as follows (step S11836). Average information LA is set to (A+B)/2 of 1 byte. Gradation width information LD is set to B−A of 1 byte. Further, if the top, two bits are "10", two bytes of code information which represent A or B of each pixel are read (step S11837). Then, it is decided whether the top one bit of one of the two bytes is "0" or "1" (step S11838). If it is "0", the code information $\phi_{ij}$ of the pixel is set to "00" in binary notation (step S11839). On the other hand, if it is "1", the code information $\phi_{ij}$ of the pixel is set to "11" in binary notation (step S118310). Then, the one byte of the code information read at step S11837 is shifted by one bit to shift the next bit to the top (step S118311). Then, the flow returns to step S11838, to repeat the above-mentioned processing. The above-mentioned processing for generating 2-bit $\phi_{ij}$ for each pixel from the top 1-bit of the code information is repeated until the two bites are completed sixteen times. Thus, four bytes of code information $\phi_{ij}$ in block truncation coding data to be decoded are generated (step S118312).

After the above-mentioned processing in correspondence to the mode information is completed, 6-byte data for each of chromaticity a* and b* for decoding from block truncation coding data are obtained as follows (step S11813). Average information LA is set to "00" (in hexadecimal notation) or 0 (in decimal notation) of 1 byte. Gradation width information LD is set to "00" (in hexadecimal notation) or 0 (in decimal notation) of 1 byte. Further, code information $\phi_{ij}$ is set to "00" (in hexadecimal notation) or 0 (in decimal notation) of 4 bytes.

The 6-byte decoded data for each of L*, a* and b* are written as the decoded data in correspondence to the mode.

Then, the 1-byte mode data is shifted by two bits in order to determine the mode information for the next block (4*4 pixels) (step S11814), and the flow returns to step S11833 for the next block.

The above-mentioned processing is repeated until one byte of the mode data have been processed, that is, until four blocks of 4*4 pixels have been processed (step S11815).

Thus, 72 bytes (4 blocks times 6 bytes times 3 color informations) are obtained as the data to be decoded with block truncation data from 1 to 9 bytes of the re-compressed data for 8*8 pixels for brightness information L* and chromaticity information a* and b*.

Next, a digital color copying machine of a third embodiment of the invention is explained. The copying machine is similar to that of the first embodiment in a point that image data are subjected to both block truncation coding and secondary encoding, but the contents of the block truncation coding and secondary encoding are different. Because a structure and image processing of the copying machine of this embodiment are similar to the counterparts of the first embodiment shown in FIGS. 1 and 2, only different points are explained for the briefness of the explanation.

In this embodiment, the attribute decision and the character attribute conversion are performed on code data obtained by block truncation coding. Thus, an amount of image data smaller than that of the original image is accessed in the attribute decision and the character attribute conversion. Thus, a scale of a circuit therefor can be reduced. As will be explained in detail below, for an image mixed with character portions and non-character portions, code data obtained by block truncation coding are encoded to reduce the amount of code data further while keeping features of the image. In order to reduce the amount of code data, the attribute of character image or non-character image is decided in the unit of a block based on the block truncation coding data. If the area unit has character attribute, 1-byte data which represents the block are extracted and stored for each of the character information and the ground information for the block. Then, the block truncation coding data (average information, gradation width information and code information for each pixel) are replaced with the character information or the ground information. If the block has character attribute, it is classified into three types of all character, all ground, and mixture of character and ground. Then, it is checked whether the attribute of the block is all character, all ground or mixture of character and ground. Then, 2-bit mode information which represents the state is assigned to each block and stored in the memory. Further, if the mode information is mixture of character and ground, code information which represents character or ground is extracted for each pixel and stored in the memory.

Figure 28:
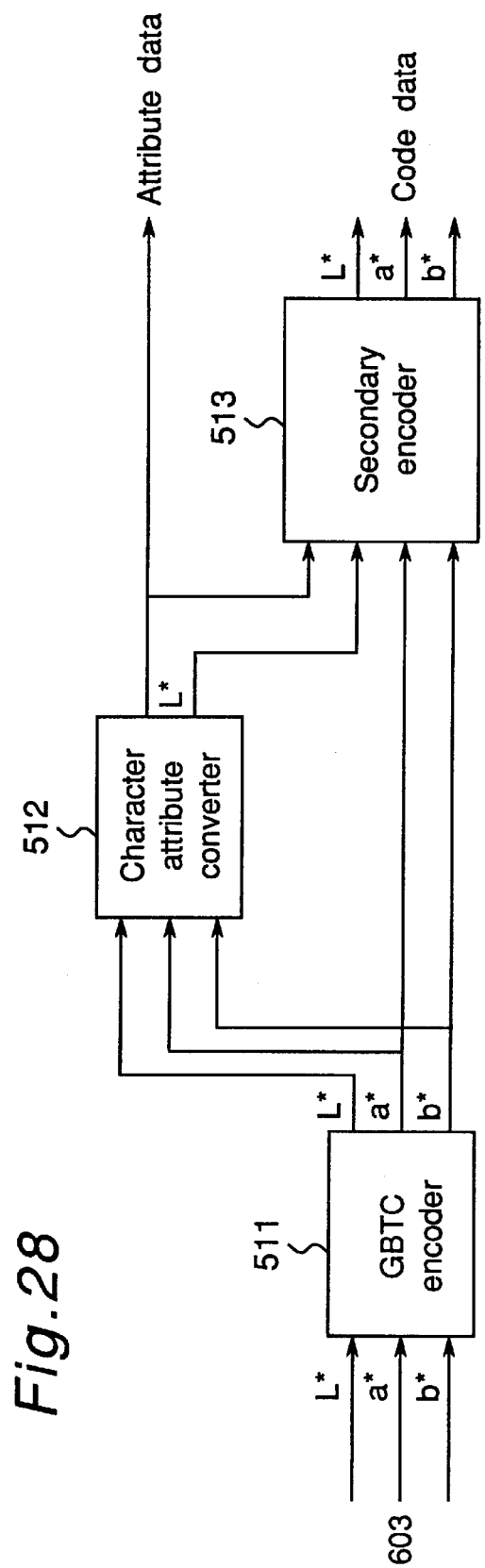
FIG. 28 is a block diagram of an encoding section of an encoder/decoder in a third embodiment of the invention.

In this embodiment, the encoder/decoder 604 performs coding for image data including mixed character portions and non-character portions (such as photograph portions). FIG. 28 is a block diagram of an encoding section of the encoder/decoder 604 of the digital color copying machine. First, a block truncation coding encoder 511 performs block truncation coding in the unit of block to reduce the amount of information. Next, a character attribute converter 512 decides attribute of character image or non-character image based on the block truncation coding data and stores the result. If the block has character attribute, 1-byte data for each of character information and ground information is extracted from the average information and gradation width information. Then, the block truncation coding data (average information, gradation width information and code information) for the block are converted with the character information and ground information as extracted above. Then, for a block of character attribute, the converted data is classified into three types of all character, all ground and mixture of character and ground. Then, the type is stored as mode information of two bits for the block. A secondary encoder 513 performs secondary encoding by using the mode information. For a case of mixture of character and background, top 1-bit is extracted from the code information of block truncation coding data and stored as 1-bit code information for each pixel.

In the encoding section of the encoder/decoder 604 shown in FIG. 28, the block truncation coding encoder 511 receives brightness information L*, chromaticity information a* and b* from the color space optimizer 603 (FIG. 2) and encodes each of L*, a* and b* in the unit of block of 4*4 pixels from 16 bytes to 6 bytes (average information LA, gradation width information LD and code information $\phi_{ij}$). The character attribute converter 512 decides attribute of character (black character) or non-character (other than black character) on the code data for 2*2 blocks encoded by the block truncation coding encoder 511 and outputs the attribute data. Further, as to the brightness information L*, the character information and the ground information for the 2*2 blocks having character attribute are calculated based on the average information LA and the gradation width information LD, and the code data are converted to the character information or the ground information. Next, the secondary encoder 513 receives code data for brightness information L* converted by the character attribute converter 512 and code data for chromaticity data a* and b* encoded by the block truncation coding converter 511 and output only necessary information according to the attribute data (character or non-character attribute) for the 2*2 blocks and deletes unnecessary information. The result of attribute decision by the character attribute converter 512 is stored in the memory as attribute data.

A decoding section in the encoder/decoder 604 is similar to the counterpart in the first embodiment shown in FIG. 7. Then, it is not explained here.

A main routine of the CPU 611 to control the entire copying machine is similar to the counterpart of the first embodiment shown in FIG. 17. However, the contents of some steps are different from the counterpart shown in FIG. 17, and only different portions are explained below.

Figure 29:
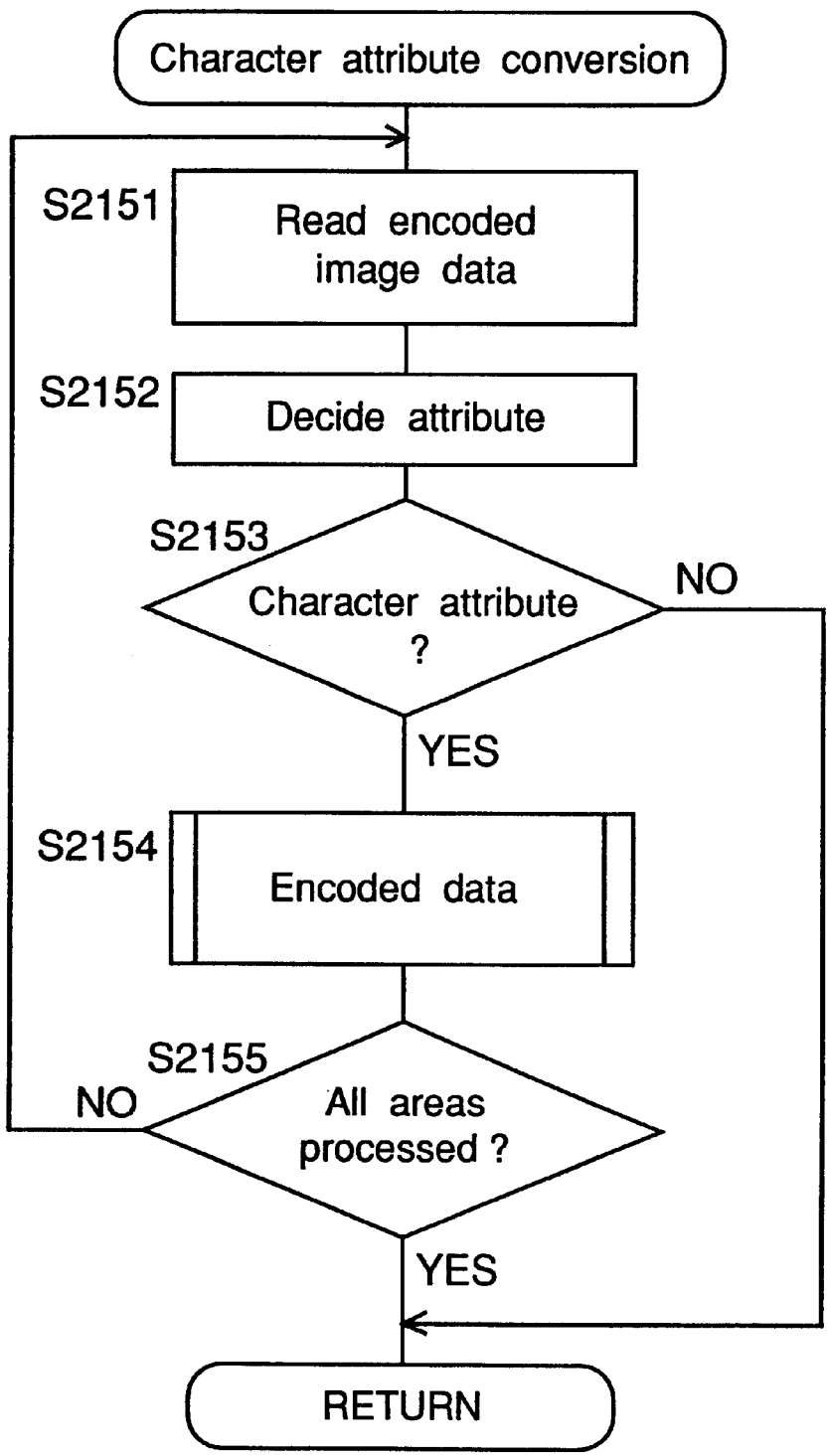
FIG. 29 is a flowchart of character attribute conversion.

FIG. 29 is a flowchart of the conversion for character attribute (step S15 in FIG. 17). Image data have been subjected to block truncation coding before the conversion. As to the code data, one attribute of character (black character in white ground) or non-character is decided for 2*2 blocks. Further, for character attribute, black character information (reflectivity in this embodiment) and white ground information in the background of black character (reflectivity in this embodiment) are determined for the block, and average information LA, gradation width information LD and code information $\phi_{ij}$ are converted by using the black character information and the white ground information. The procedure therefor is explained below.

First, block truncation coding data (that is, average information LA, gradation width information LD and code information $\phi_{ij}$ for one area (2*2 blocks) are read (step S2151) Then, it is decided whether the area has character attribute or non-character attribute based on the block truncation coding data (step S2152). Next, if the area has character attribute (YES at step S2153), the block truncation coding data of the average information LA, the gradation width information LD and the code information $\phi_{ij}$ are converted to black character reflectivity data (character information) or ground reflectivity data (ground information) for the 2*2 blocks (step S2154, refer to FIGS. 30A and 30B). Then, the flow returns to step S2151 to repeat the above processing until all the areas are processed (YES at step S2155).

Figure 30A:
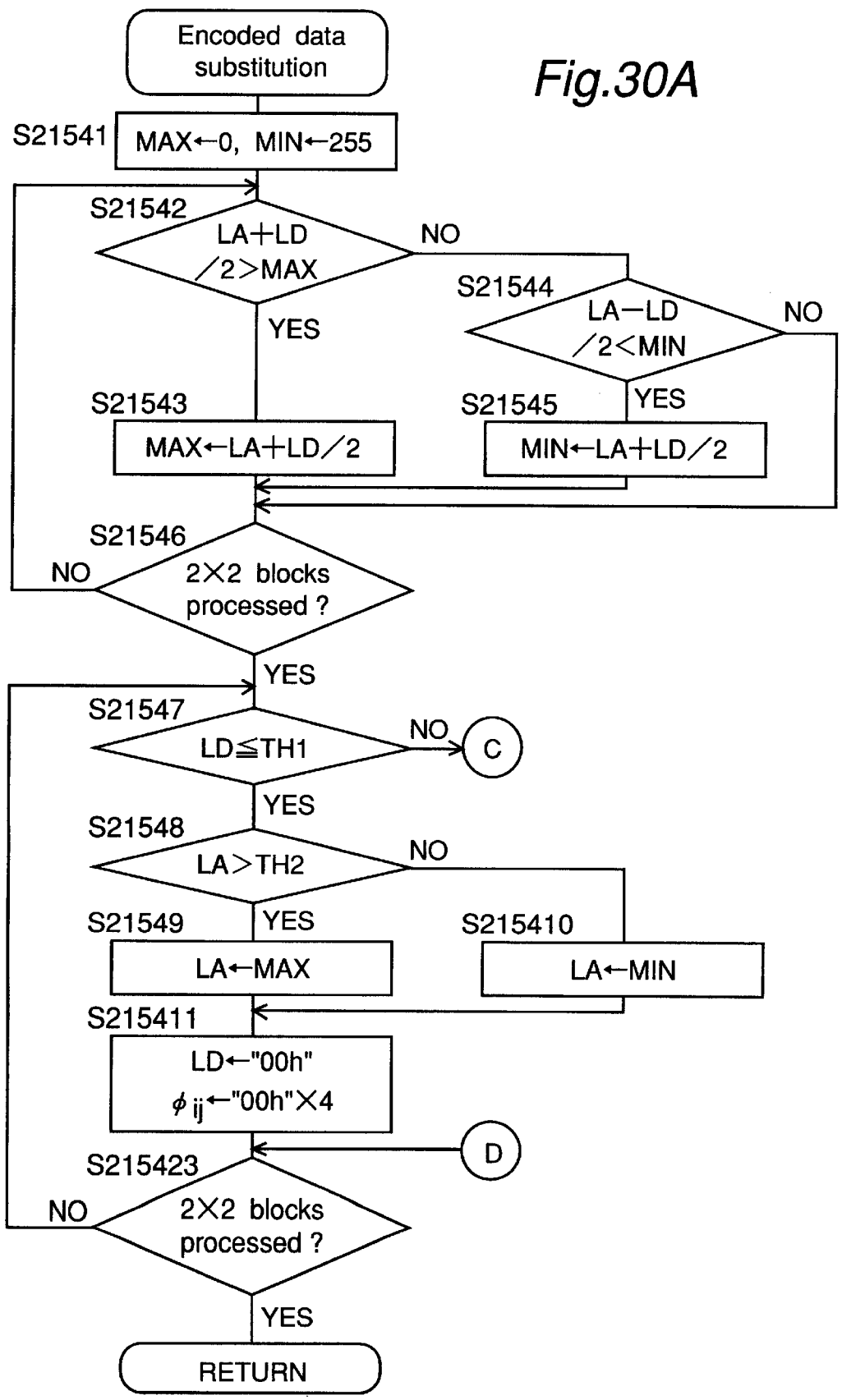
FIGS. 30A and 30B are flowcharts of replacement of code data.
Figure 30B:
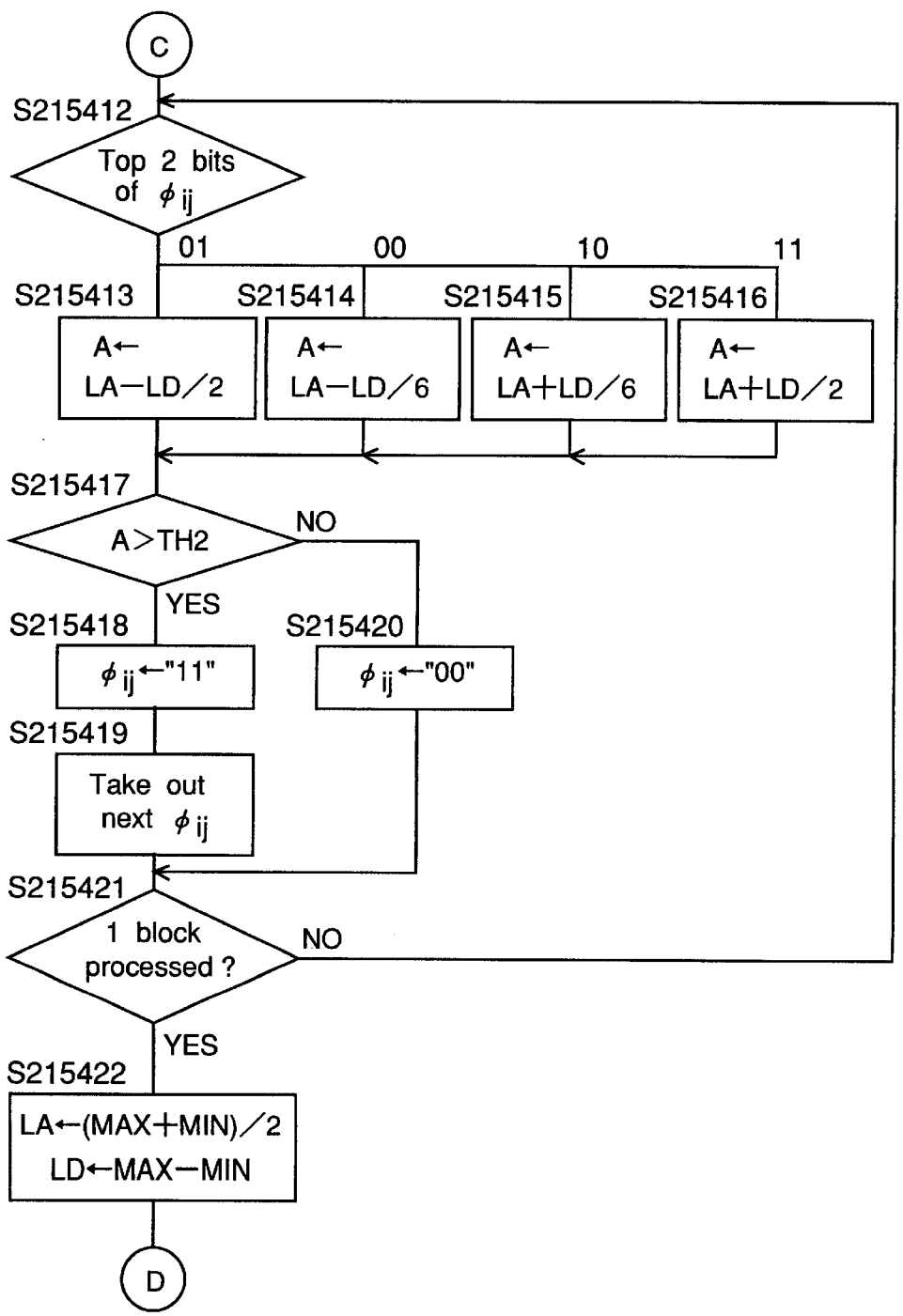

FIGS. 30A and 30B are flowcharts of the conversion of encoded data (step S2154 in FIG. 29). In this processing, the character information and the ground information of the 2*2 blocks are calculated based on the average information LA and the gradation width information LD of the brightness information L*. Then, the average information LA, the gradation width information LD and the code information $\phi_{ij}$ for the 2*2 blocks for L* are converted by using the character information and the ground information. The procedure therefor is explained below.

First, variables MIN and MAX are initialized for calculating the character information MIN and the character background information MAX for one area of 2*2 blocks (step S21541). That is, MAX is reset to 0 and MIN is reset to 255. Then, LA+LD/2 (or maximum in the block) is obtained from the average information LA and the gradation width information LD of brightness information L* for a block in the area. If LA+LD/2 is larger than MAX (YES at step S21542), MAX is set to LA+LA/2 (step S21543). On the other hand, if LA+LD/2 is equal to or smaller than MAX (NO at step S21542), and if LA−LD/2 (or minimum in the block) is larger than MIN (YES at step S21544), MIN is set to LA−LA/2 (step S21545). Then the flow returns to step S1542, and the above-mentioned processing is repeated on all the blocks in the area (step S21546). Thus, the maximum (MAX) or the character background information, and the minimum (MIN) or character information are calculated.

Next, the gradation width information LD of one of the blocks in the area is decided to be equal to or smaller than a threshold value TH1 (step S21547). That is, it is checked whether the block is at an edge or at a non-edge. In this example, the threshold value TH1 is set to 10. If LD≦TH1 (YES at step S21547), the block is at a non-edge. Then, it is checked whether it is a black character (uniform density) portion or white ground (white uniform density) portion. That is, it is decided whether the average information LA is larger than a threshold value TH2 defined below (step S21548).

$$TH2=(MAX+MIN)/2.$$

If LA>TH2 (YES at step S21548), the block is at a white ground portion, and the average information LA is set to MAX of character background information (step S21549). If LA≦TH2 (NO at step S21548), the block is at a black character portion, and the average information LA is set to MIN of character information (step S215410). Because the block is at a non-edge portion, the gradation width information LD becomes very small, and the code information $\phi_{ij}$ can be neglected. Therefore, the gradation width information LD and the code information $\phi_{ij}$ for each pixel are all converted to 0 (step S215411).

On the other hand, if the gradation width information LD is larger than the threshold value TH1 (NO at step S21547), the block is at an edge portion having an edge or a block of mixture of character and character background (ground). Then, it has to be checked whether each pixel is character or character background. Thus, code information $\phi_{ij}$ for the block is extracted, and the flow branches according to the top two bits thereof (step S215412). If the top two bits are"01", LA−LD/2 is calculated from the average information LA and the gradation width information LD and it is stored in the variable A (step S215413). If the top two bits are "00", LA−LD/6 is calculated, and it is stored in the variable A (step S215414). If the top two bits are "10", LA+LD/6 is calculated, and it is stored in the variable A (step S215415). If the top two bits are "11", LA+LD/2 is calculated, and it is stored in the variable A (step S215416). Next, it is checked whether the data A stored by using the average information LA and the gradation width information LD is larger than the threshold value TH2 (step S215417).

If the variable A is larger than the threshold value TH2 (YES at step S215417), code information $\phi_{ij}$ is set to "11" (step S215418), and next 2-bit code information $\phi_{ij}$ is taken out (step S215419). On the other hand, if the variable A is not larger than the threshold value TH2 (NO at step S215417), code information $\phi_{ij}$ is set to "00" (step S215420). Then, the flow returns to step S215412 to repeat the above-mentioned processing to set new code information si until all the data in the block are processed (YES at step S215421). Next, new average information LA and gradation width information LD are set to (MAX+MIN)/2 and MAX−MIN for the block of mixture of character and character background (step S215422).

Next, the flow returns to step S21547 to repeat the above-mentioned processing to calculate new encoding information with reference to LD until all the 2*2 blocks are processed (YES at step S215423).

Figure 31A:
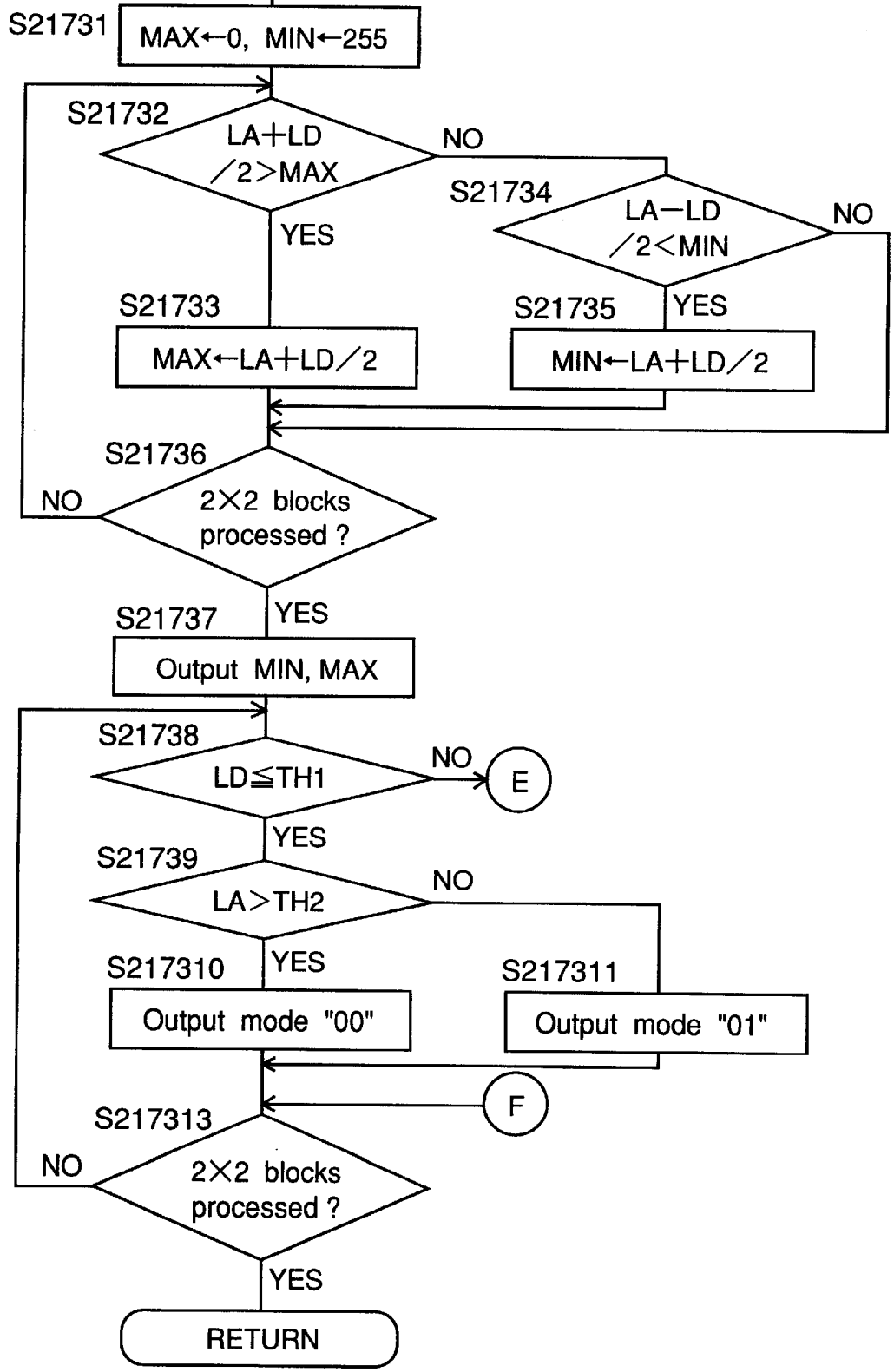
FIGS. 31A and 31B are flowcharts of character image compression.
Figure 31B:
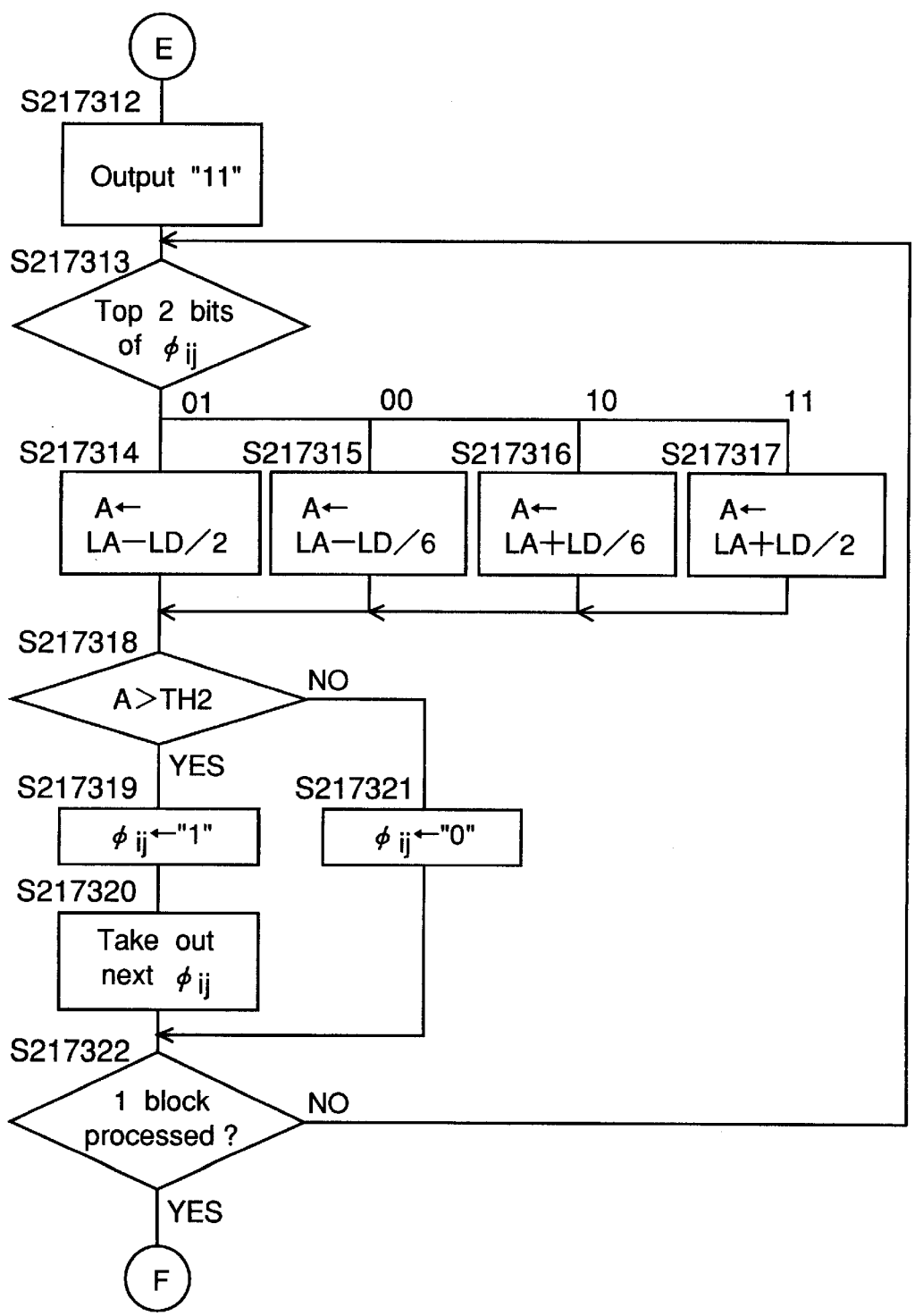

FIGS. 31A and 31B are flowcharts of the compression for character image (step S173 in FIG. 19). In the above-mentioned conversion for character attribute, the average information, the gradation width information and the code information of block truncation coding have been converted with use of the character information and the ground information. By using the converted code data, it can be decided whether pixels in a block are all character, all character background, or mixture of character and character background. The secondary encoding is performed by using the decision. That is, for character attribute, character information and character background information of 2*2 blocks are calculated and stored by using the average information LA and the gradation width information LD of brightness L* in the code data for an area of 2*2 blocks obtained by block truncation coding. Next, based on the character information, the character background information, the average information LA and the gradation width information LD of brightness L*, it is decided pixels in a block under interest in the 2*2 blocks are all character, all character background, or mixture of character and character background, and mode information which represents the result is stored. Further, only for the block of mixture of character and character background, code information which represents whether each pixel is character or character background is stored. The procedure is explained below.

First, in order to determine the character information MIN and the character background information MAX according to the encoded data, variables MIN and MAX are initialized for one area of 2*2 blocks (step S21731). That is, MAX is reset to 0 and MIN is reset to 255. Then, as to one block in the area, LA+LD/2 (or maximum in the block) is obtained from the average information LA and the gradation width information LD of brightness L* in the block truncation coding data. If LA+LD/2 is larger than MAX (YES at step S21732), MAX is set to LA+LA/2 (step S21733). On the other hand, if LA+LD/2 is equal to or not larger than MAX (NO at step S21732), and if LA−LD/2 (or minimum in the block) is larger than MIN (YES at step S21734), MIN is set to LA−LA/2 (step S21735). The above-mentioned processing is repeated on all the blocks in the area (step S21736). Thus, the maximum (MAX) or the character background information, and the minimum (MIN) or the character information are calculated, and they are output (step S21737).

Next, the gradation width information LD of one of the blocks in the area is decided to be equal to or smaller than the threshold value TH1 (step S21738). That is, it is checked whether the block is at an edge or at a non-edge. In this example, the threshold value TH1 is set to 10. If LD≦TH1 (YES at step S21738), the block is at a non-edge, Then, it is checked whether the average information LA is larger than the threshold value TH2 shown below (step S21739).

$$TH2=(MAX+MIN)/2.$$

If LA>TH2 (YES at step S17359), the block is decided to be all character, and mode information of "00" is output which represents that the block is all character (step S217310). If LA≦TH2 (NO at step S11739), the block is decided to be all character background, and mode information of "01" is output which represents that the character is all character background (step S217311).

On the other hand, if the gradation width information LD is larger than the threshold value TH1 (NO at step S21738), the block is at an edge portion having an edge or a block of mixture of character and character background, and mode information of "01" is output which represents that the block under interest is mixture of character and character background (step S217312). In this case, it has to be checked whether each pixel is character or character background. Then, code information $\phi_{ij}$ for the block is extracted, and the flow branches according to the top two bits thereof (step S217313). If the top two bits are "01", LA−LD/2 is calculated from the average information LA and the gradation width information LD, and it is stored in a variable A (step S217314). If the top two bits are "00", LA−LD/6 is calculated, and it is stored in the variable A (step S217315). If the top two bits are. "10", LA+LD/6 is calculated, and it is stored in the variable A (step S217316). If the top two bits are "11", LA+LD/2 is calculated, and it is stored in the variable A (step S217318). Next, it is checked whether the data A is larger than the threshold value TH2 (step S217318). If the variable A is larger than the threshold value TH2 (YES at step S217318), code information $\phi_{ij}$ is set to "1" (step S217319), and next 2-bit code information is taken out (step S2173120). On the other hand, if the variable A is not larger than the threshold value TH2 (NO at step S217318), code information $\phi_{ij}$ is set to "0" (step S217321). Then, the flow returns to step S217313 to repeat the above-mentioned processing to set new code information $\phi_{ij}$ until all the data in the block are processed (YES at step S217322).

Next, the flow returns to step S21738 to repeat the above-mentioned processing to calculate new encoded data for character attribute with reference to LD until all the 2*2 blocks are processed (YES at step S217313).

As explained above, in the second and third embodiments, the amount of information can be reduced to a large extent by combining block truncation coding with secondary encoding, similarly to the first embodiment.

Further, for a block of character attribute, by replacing each image data in the block with the character information or character background information, the block truncation coding data are all classified into three states of all character, all character background, and mixture of character and character background. Then, when the code information is binarized, problems such as jaggy, missing and noises which occur on decoding can be solved for a character image. Further, because the secondary encoding is performed while keeping features of the image for a block of character attribute, the character density and ground density (or brightness for color image) can be reproduced on decoding. Then, density difference does not occur at a boundary between blocks of the non-character attribute and the character attribute, and good image quality can be reproduced.

Further, the attribute decision and the character attribute conversion are performed on the block truncation coding data, so that image data relatively smaller than the original image data are processed. Therefore, a scale of a circuit (such as a capacity of buffer memory) for the attribute decision and the character attribute conversion can be reduced. Further, deterioration of character image on decoding can be prevented while maintaining the resolution of the character image, and the character image can be encoded at a high compression ratio. Especially, image deterioration due to density difference between character and non-character attributes can be prevented. Further, because the secondary encoding is performed for each block with relation to the block truncation coding data, image processing, edition and the like can be performed easily on the code data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
   a decider which decides based on image data of pixels included in a block whether the block has character attribute or non-character attribute;
   a binarizer which binarizes the image data;
   a first encoder which encodes the image data with block truncation coding;
   a second encoder which encodes the image data which have been encoded by said first encoder; and
   a controller for controlling said binarizer, said first encoder, and said second encoder, wherein said controller makes said binarizer binarize the image data of the block and makes said first and second encoders encode the binarized image data of block when said decider decides that the block has character attribute, and wherein said controller makes said first and second encoders encode the image data of the block without binarization of the image data of the block by said binarizer when said decider decides that the block has non-character attribute.

2. The image processor as claimed in claim 1, further comprising a divider which divides the image data into blocks each consisting of a plurality of pixels, wherein said decider processes the decision for each block divided by said divider.

3. The image processor as claimed in claim 1, wherein said second encoder performs first encoding for character attribute and second encoding for non-character attribute different from the first encoding.

4. The image processor as claimed in claim 1, wherein said binarizer binarizes the image data by replacing each image data with character level or ground level.

5. The image processor as claimed in claim 1, wherein the image data supplied to said decider are color image data including brightness and chromaticity data.

6. The image processor as claimed in claim 1, wherein said second encoder generates mode information which represents the image data in the block of character attribute are all black, all white or mixture of black and white and encodes the image data according to the mode information.

7. The image processor as claimed in claim 1, wherein said second encoder decides whether image data of the pixels in the block of non-character attribute is color or black and white and encodes the image data according to the decision.

8. An image processor comprising:
   a first decider which decides whether image data of pixels in an area are all character, all ground or mixture of character and ground, wherein the area consists of a plurality of blocks;
   an encoder which encodes the image data differently according to the decision by said first decision means, wherein the encoding by said encoder is performed for the image data in each block; and
   a second decider which decides based on image data of pixels included in a block whether the block has character attribute or non-character attribute, wherein said first decider performs the decision for the area decided to have character attribute by said second decider.

9. The image processor as claimed in claim 8, further comprising a divider which divides the image data into the blocks each consisting of a plurality of pixels, wherein said second decider processes the decision for each block divided by said divider.

10. The image processor as claimed in claim 8, further comprising a converter which converts each image data to character level or ground level in the area decided to have character attribute by said second decider, wherein said encoder encodes the image data which have been converted to the character or ground level by said converter.

11. The image processor as claimed in claim 10, further comprising a second encoder which encodes the image data with block truncation coding, and said first decider performs the decision based on the image data which have been encoded by said second encoder.

12. The image processor as claimed in claim 11, further comprising a second encoder which encodes the image data converted by said converter with block truncation coding, and said first decider performs the decision based on the image data which have been encoded by said second encoder.

13. The image processor as claimed in claim 9, wherein said encoder stores the character and ground levels and a result of the decision by said first decider, and, only for a block of mixture of character and ground, a code which represents whether each of the pixels in the block is character or ground.

14. The image processor as claimed in claim 8, further comprising a second encoder which encodes the image data in the block with block truncation coding, and said second decider performs the decision based on the image data which have been encoded by said second encoder.

15. The image processor as claimed in claim 8, wherein the image data supplied to said decider are color image data including brightness and chromaticity data.

16. The image processor as claimed in claim 8, wherein said second encoder generates mode information which represents that the image data in the block of character attribute are all black, all white or mixture of black and white, and encodes the image data according to the mode information.

17. The image processor as claimed in claim 8, wherein said second encoder decides whether image data of the pixels in the block of non-character attribute is color or black and white, and encodes the image data according to the decision.

18. A method for encoding image data, said method comprising the steps of:
   (a) deciding based on image data of pixels included in a block whether the block has character attribute or non-character attribute;

(b) binarizing the image data of the block;

(c) encoding the image data of the block which has been binarized in the step (b) by using a block truncation coding and further encoding the image data of the block which has been encoded by using the block truncation coding in a case where the block is decided having character attribute in the step (a); and (d) encoding the image data of the block which has not been binarized in the step (b) by using the block truncation coding and further encoding the image data of the block which has been encoded by using the block truncation coding in a case where the block is non-character attribute based on the decision in the step (a).

19. A method for encoding image data, said method comprising the steps of:

(a) deciding whether image data of pixels in an area are all character, all ground, or mixture of character and ground, wherein the area consists of a plurality of blocks;

(b) encoding the image data differently according to the decision in the step (a), wherein the encoding by the step (b) is performed for the image data in each block; and (c) deciding based on image data of pixels included in a block whether the block has character attribute or non-character attribute, wherein the decision in step (a) is performed for the area decided to have character attribute.

20. An image processor comprising:

a dividing means for dividing image data into a plurality of areas;

an attribute deciding means for deciding whether each of the areas divided by said dividing means has character attribute or non-character attribute;

a replacing means for determining character level and ground level on each of the areas decided by said attribute deciding means to have character attribute and for replacing the image data of pixels in each of the areas with the character level or the ground level;

an encoding means for encoding the image data with block truncation coding in each of blocks in the areas having the image data replaced by said replacing means;

a block type deciding means for deciding block type on each of the blocks, based on encoded data obtained by said encoding means, by determining whether each of the blocks is a first block having the character level on all the pixels in the block, a second block having the ground level on all the pixels in the block or a third block having a mixture of the character and ground levels;

a code determining means for, based on the encoded data, determining a code representing whether each of the pixels in the block is character or ground; and a re-encoding means for storing the character level and ground level determined by said replacing means, and the block type decided by said block type deciding means, and for storing the code determined by said code determining means only for the third block decided by said deciding means besides the character and ground levels and block type.

21. An image processor comprising:

a dividing means for dividing image data into a plurality of blocks;

an encoding means for encoding the image data with block truncation coding in each of blocks divided by said dividing means;

an attribute deciding means for deciding whether each of the blocks divided by said dividing means has character attribute or non-character attribute, based on the data encoded by said encoding means;

a converting means for determining character level and ground level on each of the blocks divided by said dividing means, based on the encoded data obtained by said encoding means, and for converting encoded data obtained by said encoding means, based on the character and ground levels; and a re-encoding means for storing block type classified based on the encoded data converted by said converting means, and for storing codes representing whether each of the pixels in the block is character or ground, besides the block type, only for each of the blocks decided to have character attribute, the block type including a first block wherein all the pixels in the block are character, a second block wherein all the pixels in the block are ground, and a third block having a mixture of character and ground.

22. An image processor comprising:

a dividing means for dividing image data into a plurality of areas;

an attribute deciding means for deciding whether each of the areas divided by said dividing means has character attribute or non-character attribute;

an area type deciding means for deciding area type on each of the areas decided by said attribute deciding means to have character attribute by determining whether each of the areas is a first area of all character, a second area of all ground, and a third area of mixture of character and ground;

an encoding means for encoding the image data in the unit of block based on the area type determined by said area type deciding means, wherein the block is different from the area in size.

23. An image processor comprising:

a dividing means for dividing image data into a plurality of areas;

an attribute deciding means for deciding whether each of the areas divided by said dividing means has character attribute or non-character attribute;

an encoding means for encoding the image data in the unit of block different from the area;

a block type deciding means for deciding a block type on each of the blocks based on encoded data obtained by said encoding means by determining whether each of the blocks is a first block of all character, a second block of all ground or a third block of a mixture of character and ground; and a re-encoding means for encoding the encoded data obtained by said encoding means based on the block type determined by said block type deciding means.

* * * * *